United States Patent
Sailaja et al.

(10) Patent No.: US 7,412,000 B1
(45) Date of Patent: Aug. 12, 2008

(54) MAXIMUM LIKELIHOOD BLOCK DECISION FEEDBACK ESTIMATION FOR CCK DEMODULATION APPARATUS AND METHOD

(75) Inventors: Sankabathula Dharani Naga Sailaja, Vijayawada (IN); Parthasarathy Murali, Hyderabad (IN); Narasimhan Venkatesh, Hyderabad (IN)

(73) Assignee: RedPine Signals, Inc., San Jose, CA (US)

( * ) Notice: Subject to any disclaimer, the term of this patent is extended or adjusted under 35 U.S.C. 154(b) by 719 days.

(21) Appl. No.: 10/934,275

(22) Filed: Sep. 3, 2004

(51) Int. Cl.
 *H03H 7/30* (2006.01)
 *H03H 7/40* (2006.01)
 *H03K 5/159* (2006.01)
(52) U.S. Cl. .................. 375/233; 375/229; 375/232
(58) Field of Classification Search ............ 375/229, 375/262, 148, 150, 152
See application file for complete search history.

(56) References Cited

U.S. PATENT DOCUMENTS

| | | | | |
|---|---|---|---|---|
| 5,402,445 | A * | 3/1995 | Matsuura | 375/229 |
| 6,233,273 | B1 | 5/2001 | Webster et al. | |
| 6,563,858 | B1 | 5/2003 | Fakatselis et al. | |
| 6,674,818 | B1 | 1/2004 | King et al. | |
| 6,690,715 | B2 * | 2/2004 | Webster et al. | 375/148 |
| 6,748,011 | B2 * | 6/2004 | Ekvetchavit et al. | 375/148 |
| 7,180,963 | B2 * | 2/2007 | Wang et al. | 375/324 |
| 7,187,730 | B1 * | 3/2007 | Hu et al. | 375/343 |
| 7,277,515 | B2 * | 10/2007 | Yen | 375/350 |
| 2004/0190440 | A1 * | 9/2004 | Kim et al. | 370/210 |
| 2004/0196933 | A1 * | 10/2004 | Shan et al. | 375/346 |
| 2005/0053172 | A1 * | 3/2005 | Heikkila | 375/333 |

OTHER PUBLICATIONS

Cosovic, Ivan, "Performance of Coded Uplink MC-CDMA with Combined-Equalaztion in Fadin Channels", German Aerospace Center, Institute of Communications and Navigation.*

Cosovic, Ivan, "Pre- Post- and Combined -Equalization Single-User Bounds for MC-CDMA", 2004, European Conference on Wireless Technology, 321-324.*

Dlugaszewski, Z., "Performance of Several OFDM transceivers in the indoor radiochannels in 17GHz band", 2001, Vehicular Technology Conference, vol. 2, 825-829.*

Cosovic, Ivan, "Combined Pre- and Post- Equalization for uplink time division duplex MC-CDMA in Fading Channels", 2004, Kluwer Academic Publishers.*

Audeh, Kahn and Barry, "Decision-Feedback Equalization of Pulse-Position Modulation on Measured Non-Directed Indoor Infrared Channels", IEEE Transactions on Communications V47, No. 4, Apr. 1999.

(Continued)

*Primary Examiner*—David C. Payne
*Assistant Examiner*—Brian J Stevens
(74) *Attorney, Agent, or Firm*—Jay A. Chesavage

(57) ABSTRACT

A maximum likelihood CCK detector has a first subtractor which subtracts the contents of a pre-equalize register from a current symbol, and the output of this subtractor is coupled to a simple Fast Walsh Transform (FWT) with an iteration variable k. The output of the FWT is coupled to a second subtractor for subtracting a plurality of ICI corrections for all possible current symbols computed from the post-FWT domain value of the current CCK symbol and stored in post equalization registers. A post equalization register contains values computed from feedback filter coefficients determined during a packet preamble, where the feedback filter coefficients are provided to a reduced complexity post equalization value generator which populates the post equalization register using an iteration variable i.

27 Claims, 12 Drawing Sheets

OTHER PUBLICATIONS

Hwang, Liu & Han, Novel Block Equalization Design for Wireless Communications with ISI and Rayleigh Fading Channels, National University of Science & Technology, Touliu, Yulin, Taiwan ROC.

Batabyal & Sarmah, "A Computationally Efficient Algorithm for Code Decision in CCK Based High Data Rate Wireless Communications", Hellosoft, Hederabad, India.

Lin, Chang, Huang & Lin, "A Flexible Design for a Decision Feedback Equalizer and a Novel CCK Technique for Wireless LAN Systems", National Chung-Hsing University, Taiwan ROC.

Barman, Bansiomar, & Reddy, "A Reduced Complexity Decision Feedback Equalization in Spread Spectrum Based in LAN", Hellosoft, Hyderabad, India.

Barman and Halipatil, "ICI Equalizer in a CCK Based DSSS Communication System", Hellosoft, Hyderabad, India.

* cited by examiner

Figure 1
| bit pattern | phase |
|---|---|
| 0 0 | 0 |
| 0 1 | $\pi/2$ |
| 1 0 | $\pi$ |
| 1 1 | $3\pi/2$ |
Figure 2
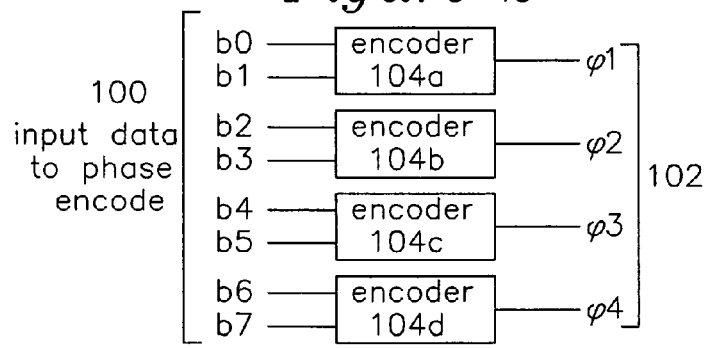
Figure 3
$$c = \{e^{j(\varphi_1+\varphi_2+\varphi_3+\varphi_4)}, e^{j(\varphi_1+\varphi_3+\varphi_4)}, e^{j(\varphi_1+\varphi_2+\varphi_4)}, -e^{j(\varphi_1+\varphi_4)},$$
$$e^{j(\varphi_1+\varphi_2+\varphi_3)}, e^{j(\varphi_1+\varphi_3)}, -e^{j(\varphi_1+\varphi_2)}, e^{j\varphi_1}\}$$
Figure 4
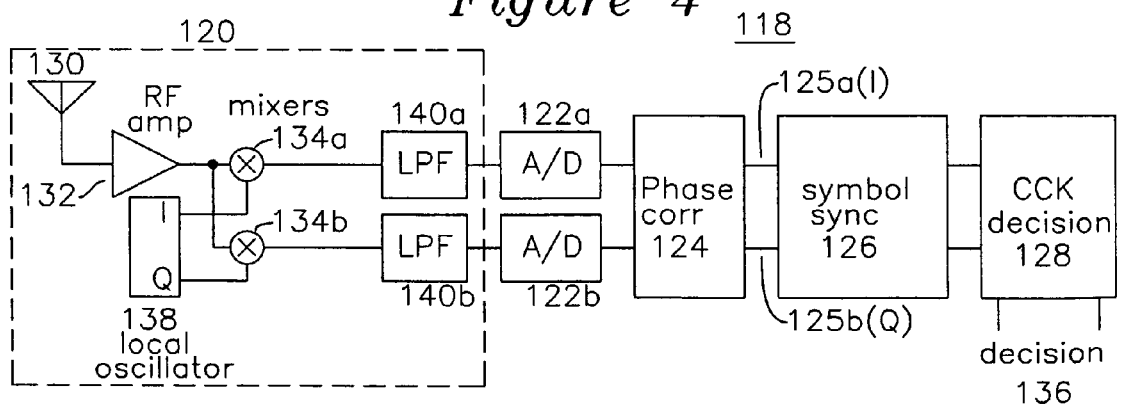

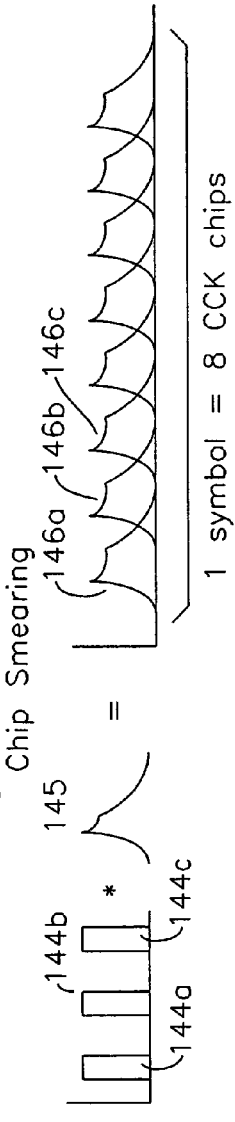
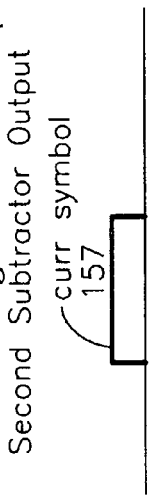
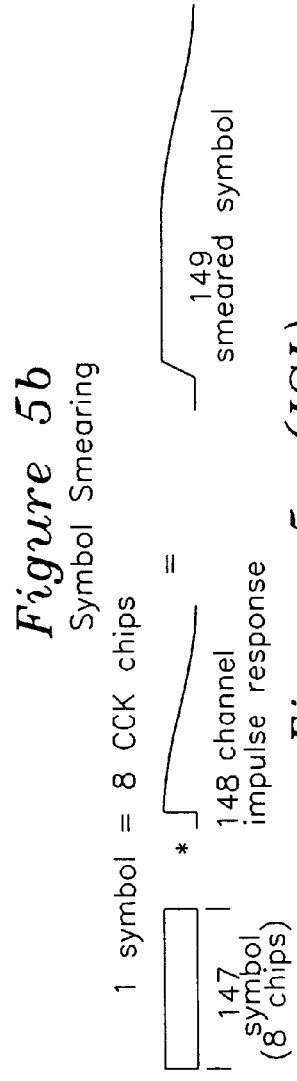
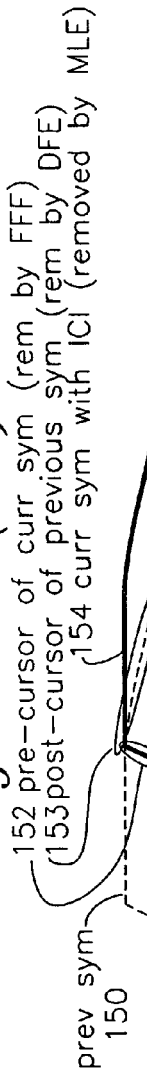
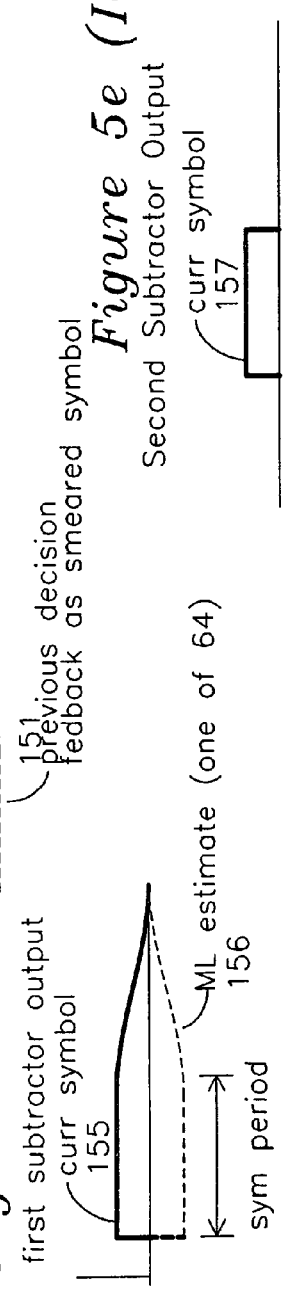

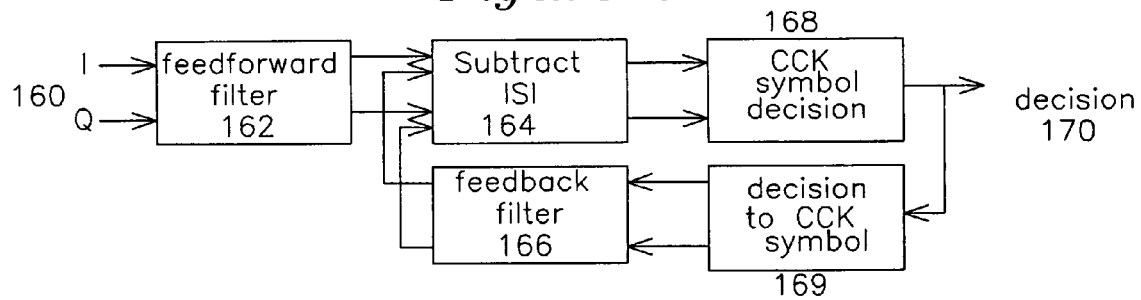
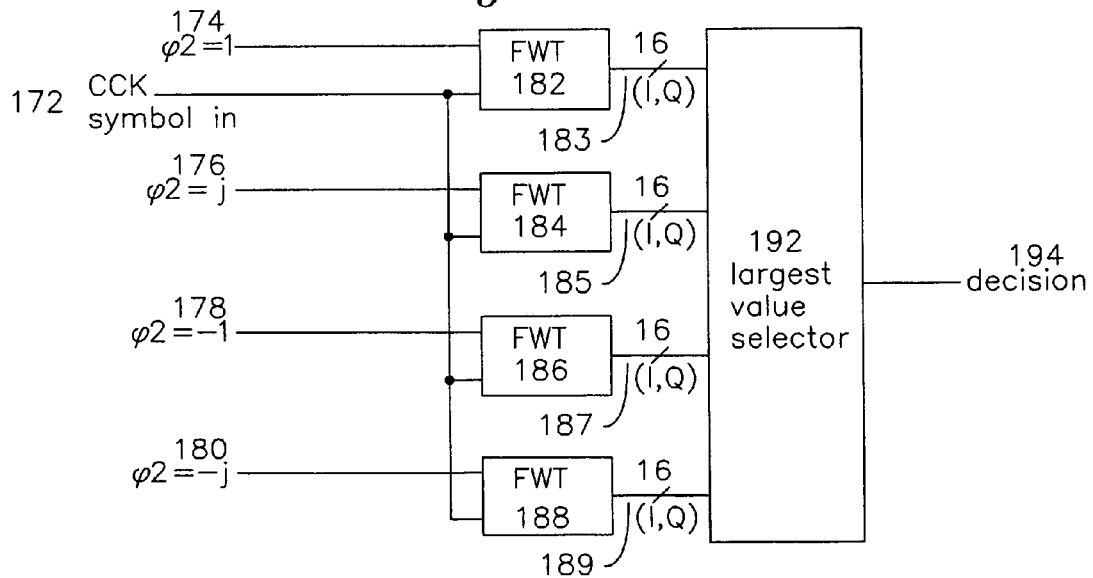

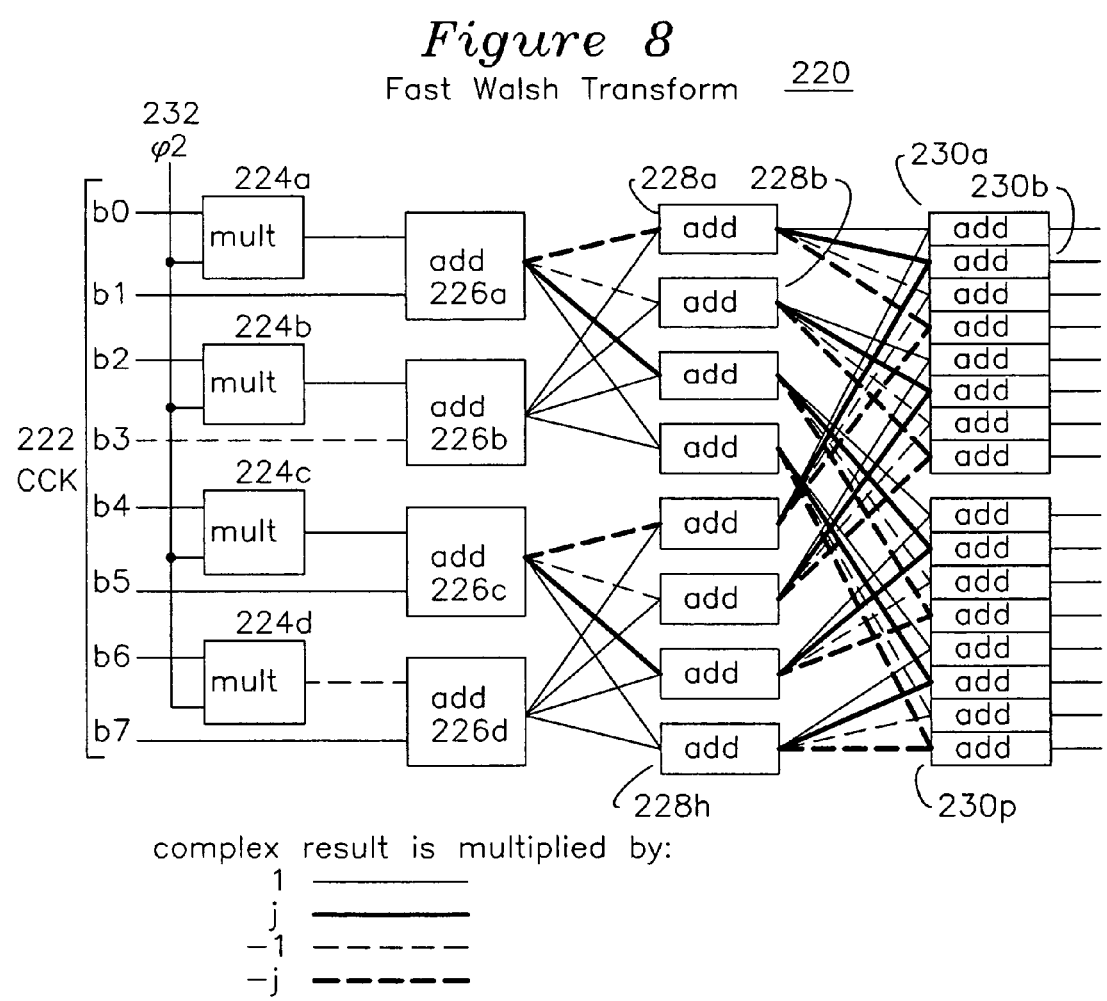

channel impulse response 602

8 chip symbol 600 incoming chip stream 382

8 chip prev sym 604
8 chip curr sym 606 symbol stream 386 (8 chips per symbol)

8 chip prev sym 608
8 chip curr sym 610 first subtractor output 390 (DFE)

8 chip prev sym 612
8 chip curr sym 616
8 chip DFE 614

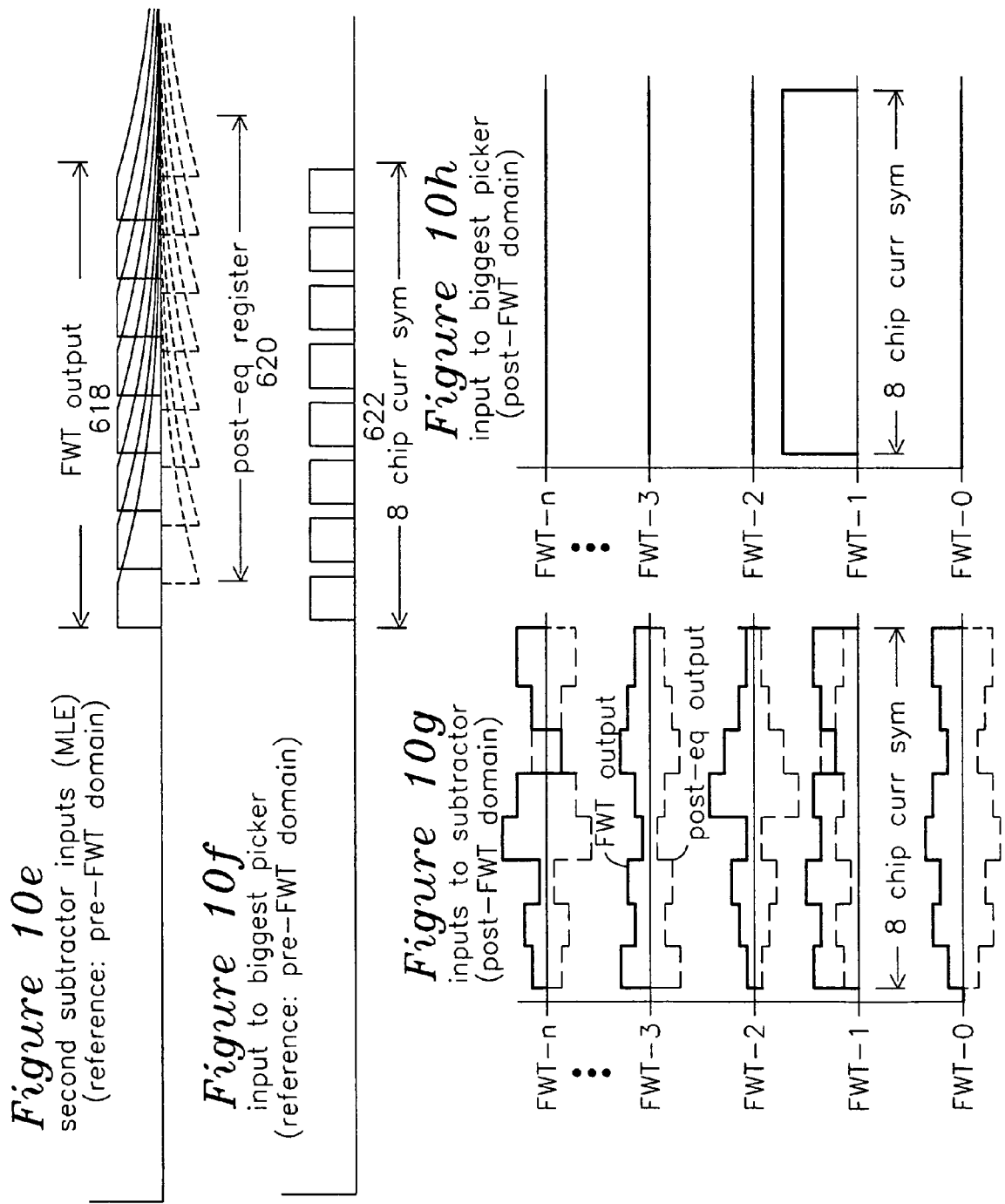

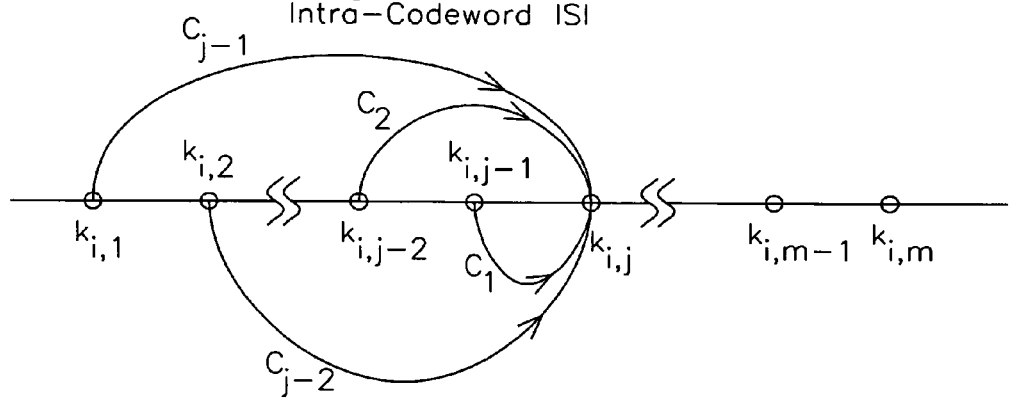
*Figure A-1*
Intra-Codeword ISI
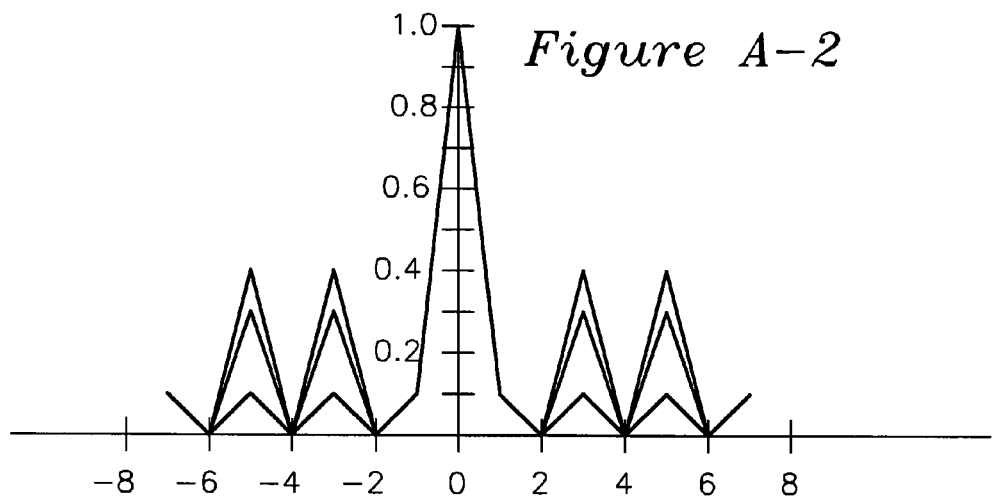
*Figure A-2*
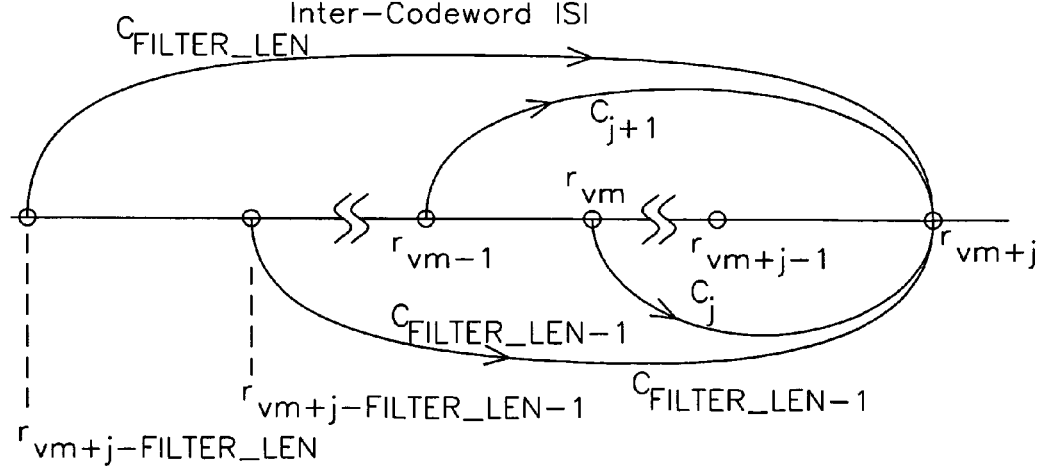
*Figure B-1*
Inter-Codeword ISI

MAXIMUM LIKELIHOOD BLOCK DECISION FEEDBACK ESTIMATION FOR CCK DEMODULATION APPARATUS AND METHOD

FIELD OF THE INVENTION

The present invention is related to the demodulation of CCK code symbols, where each symbol is formed from a plurality of CCK chips in a wireless IEEE 802.11b system where these CCK code symbols are presently used for 5.5 Mb and 11 Mb data rates. The invention is extensible to demodulation of code symbols which are Direct Sequence Spread Spectrum (DSSS) phase encoded using Walsh-Hadamard chipping sequences.

BACKGROUND OF THE INVENTION

Prior art wireless communication systems are defined in the IEEE protocols for 802.11b. IEEE 802.11b is an example of a spread spectrum wireless protocol whereby a transmitter emits an isotropic or multidirectional signal including a sequence of broadband phase modulation of a carrier according to a known sequence, where the sequence is referred to as a chipping code. For 1 Mb and 2 Mb IEEE 802.11b data rates, the chipping code is a Barker code. A receiver may be placed within a reception distance from the source, and it is common for a plurality of signals to arrive at the receiver, which may be a first signal which travels a shortest path, followed by reflected signals which have path lengths which may be longer than the shortest path. Additionally, the shortest path may be through an attenuating medium, such that the shortest path does not correspond to the strongest signal. The receiver must recover this plurality of signals and apply a method of filtering before demodulating the transmitted CCK symbol into decision data. One prior art method for compensating a communications channel uses channel sounding, whereby the communications channel is characterized by sending a known signal such as a packet preamble to determine the transfer function of the channel, and then applying a combining filter function to use the channel reflections in the decision process, thereby improving the decision's reliability. This filter function is known as a channel matched filter (CMF), which in implementation may be either a separate filter or a filter combined with a feed-forward filter (FFF). Because the topology of a feed forward filter involves complex multiplications and additions, the complexity of the filter grows with the number of taps in the filter, and it is desired to minimize the number of taps in this filter. The channel matched filter and the feed-forward filter become more critical with higher data rates, since the reflections may be fixed in time duration, and the higher data rate causes degradation over a longer interval compared to the symbol rate. For example, using a 11 Mhz clock, 11 bits of a Barker code may be transmitted over 1 us for 1 Mb data rate, and the receiver must correlate a single 11 bit code to single binary value. At 11 Mb, the transmitted data is organized into 8 bit symbols, and there are 64 different CCK symbols to decode rather than two Barker codewords, with phase decoding used to recover the remaining 2 bits of data. At these higher data rates using CCK symbols, the channel is more susceptible to bit errors associated with the same multipath reflections, and greater care must be taken in the receiver signal processing leading up to demodulation of the symbols into decision data.

FIGS. 1 and 2 show the phase encoding pattern for encoding data to be transmitted into four phase terms used to form the CCK symbol. Each pair of incoming bit patterns is phase encoded according to FIG. 1. For a real-valued signal in a quadrature phase mapping, the phases may be represented as 1 (representing phase 0 phase change), j (representing a phase change of $\pi/2$), –1 (representing a phase change of $\pi$), and –j (representing a phase change of $3\pi/2$). FIG. 2 shows 8 bit data 100 applied as an input to encoders 104a-104d, which perform phase encoding by bit pairs into four values of phase information 102, each having one of the values $\{1,j,-1,-j\}$ according to the two bit (dibit) mapping shown in FIG. 1. The CCK symbol is generated using the expression of FIG. 3, whereby each of the 4 phases 102 generates the symbol C, comprising 8 chips of phase information, each chip having one of the values $\{1, j, -1, -j\}$ where the phases represent the real and imaginary components according to Eulers formula:

$$e^{j\phi}=\cos(\phi)+j\sin(\phi).$$

FIG. 4 shows a typical signal processing system 118 for the demodulation of DSSS CCK symbols such as an IEEE 802.11b system operating at 5.5 Mb or 11 Mb. An RF front end 120 includes an antenna 130 coupled to an RF amplifier 132 and a pair of baseband mixers 134a and 134b which mix the output of the RF amplifier 132 to baseband using quadrature outputs of local oscillator 138, which is operating at the carrier frequency of the transmitted data. The baseband quadrature signal from mixers 134a and 134b is filtered by matched low pass filters (LPF) 140a and 140b. The input to A/D converters 122a and 122b and the subsequent signal processing operate on analytic signals in quadrature form, where the quadrature signal includes the real and imaginary components in separate signal processing channels. The quadrature signal leaving the anti-aliasing, or low pass, filters 140a and 140b is sampled by A/D converters 122a and 122b and converted into a binary representation typically comprising 6 bits of in-phase and 6 bits of quadrature data. The quadrature output of the A/D converters 122a and 122b is then phase corrected 124 such that during the preamble interval of a received packet, the real (1 and –1) component of the analytic signal is maximized in the I channel, and the imaginary (j and –j) component is therefore in the Q channel. During the preamble part of the packet, the preamble is real valued, rather than complex valued, such that after phase correction 124, all of the preamble signal is maximized in the real (I) channel 125a and minimized in the imaginary (Q) channel 125b. The Q output 125b of the phase corrector 124 has no imaginary component, so the phase corrector operates to maximize the real output 125a, and later in the packet, when the coding switches to quadrature CCK, the demodulation which follows starts from a known phase rotation established during the preamble interval. The phase correction 124 may also include ongoing phase correction to compensate for phase variations over the duration of the packet, and this is often accomplished by multiplying the quadrature input with a quadrature representation of a sine function which is slowly varied to track variations in phase of the incoming signal, or using look-up tables, or any means known in the prior art. The phase corrector 124 therefore initializes and maintains the phase of the signal presented to the symbol sync 126 and CCK decision 128 over the duration of the packet. Symbol synchronization 126 converts the serial stream of CCK chips into a framed series of CCK symbols of 8-chips each, each complex chip represented as 6 bits of binary data for each real and imaginary component. This framed CCK symbols are sent to the CCK decision block 128, which converts the framed CCK symbols into decisions as to which is the most likely symbol received.

Each CCK symbol, also known as a CCK codeword, to be demodulated into 8-data bits is composed of 8 CCK chips, and each CCK chip represents a particular phase encoded value of part of the 8-data bits that was transmitted, as was described earlier. Two commonly practiced techniques for deciding from the 8 CCK chips of the CCK symbol received which data was transmitted are the use of hard decisions based on individual CCK chip decisions, and soft block decisions using n=8 CCK chips at a time. In a hard decision decoder, each individual CCK chip is examined and a hard binary decision is made on each CCK chip based on a threshold parameter, and after 8 such binary decisions are independently made for an 8 chip symbol, a data decision can then be made based on mapping the 8 independent binary CCK chip decisions to a closest (measured by Hamming distance) data decision. In a soft decision decoder as used in the present invention, a block decision is made using all native I&Q sample values on the 8 CCK chips based on the euclidian distance from 8 received chips to a nearest 8 chip CCK codeword. In poor signal to noise conditions, and with a sufficiently sampled digital signal representing each CCK chip, the soft decision decoder is found to produce better code decisions than the hard decision decoder.

An additional degradation of the decision process comes in the form of multipath reflections. Multipath reflections in the communications channel result in bleeding, or spreading, of individual CCK chips, and also generate delayed copies of the CCK chips. While bleeding and delayed copies of CCK chips are all part of the same multipath reflection effect, the prior art corrections for them are handled according to whether they cause the CCK chip degradation inside or outside a symbol boundary. Multipath reflections which cause signal bleeding within a symbol block of 8 chips are known as intra-symbol bleeding, and are also referred to as inter-chip interference ICI, and can be handled within the CCK chip soft decoder, since it is using all 8 CCK chips to make a decision, while signal bleeding which transfers energy from one symbol to another symbol is known as inter-symbol interference ISI and must be corrected using Decision Feedback Equalization, as will be described later.

FIG. 5a shows the time domain smearing effect of a series of CCK chips 144a, 144b, 144c, which are convolved with the Fourier transform of the channel response 145 in the time domain. The time-domain channel response 145 includes multipath reflections which cause smearing of the individual chips 144a, 144b, 144c into the received responses 146a, 146b, 146c. After multipath reflection, the separate chips are smeared in duration and for a linear system are additive such that the tail of a previous symbol becomes a post-cursor for the present symbol. The incoming chip stream to the CCK demodulator includes beginning of chip 146b adding into the tail of chip 146a, and the tail of chip 146b adding into the beginning of chip 146c, generating ICI. For clarity in showing ICI, FIG. 5a shows short duration channel smearing 145 which is approximately equal to one CCK chip duration. FIG. 5a shows ICI, however in a a typical WLAN setting, the leading edge of the channel impulse response function 145 has maximum phase change, while the tail is much longer than a single chip, and includes minimum phase components lasting many symbol lengths.

FIG. 5b shows an 8 chip CCK symbol 147, and when the symbol 147 is passed through a communications channel with the impulse response 148, a smeared symbol 149 results, which includes ICI as described in FIG. 5a, and also smears and broadens the extent of the 8 chip symbol 149 compared to the original symbol 147. When a series of such smeared CCK symbols 149 are received, information from other symbols bleeds into the current symbol, as shown in FIG. 5c. The thick line represents the smeared current symbol 154, while the dashed line represent the previous symbol 150. The resulting ISI is the sum of waveforms 150 and 154 of FIG. 5c. A feedforward filter may be used to correct the phase shifts and minor delay shifts within each chip, thereby correcting the pre-cursor effects 152 of the current symbol. A technique known as Decision Feedback Equalization (DFE) may be used to smear a previous decision using knowledge of the communication channel impulse response 148, and then invert and add the previous decision smeared symbol 151 into the current symbol 154 and previous symbol 150, thereby removing the previous symbol 150 from the symbol stream, leaving only the current symbol 154 shown as the DFE result 155 of FIG. 5d, which then contains only the current symbol 155 including ICI. Current symbol post cursor effects are of 2 types: post-cursor ISI representing interference between the current symbol 154 and a post-cursor 150 of a previous symbol, which is removed by the feedback filter of DFE which produced waveform 151, and post-cursor ICI from the current symbol. Post-cursor ICI can be removed by Maximum Likelihood Estimation (MLE), as will be described. In Decision Feedback Equalization, once the current symbol decision has been made and presented as decision data, it is converted back into an 8 chip symbol, smeared with the minimum phase part of the channel impulse response, and the smeared version of this previous symbol is subtracted from the current symbol, which improves the decision for the current symbol. In Maximum Likelihood Estimation, a soft decision (decision based on euclidian distance based on a block of 8 chips) is made on the current symbol based on subtracting the ICI component for all possible 256 current symbols from the current symbol, which has the effect of increasing the detector response for the correct symbol, and comparatively reducing the detector response for incorrect symbols. By making soft decisions based on subtracting the ICI from all possible current symbols, the accuracy of the decision is improved, shown as cleaned up waveform 157 of FIG. 5e.

FIG. 6 shows the block diagram for a prior art block decision feedback equalizer such as described in FIGS. 6 and 7 of U.S. Pat. No. 6,233,273 by Webster et al. Incoming quadrature CCK symbols are presented at input 160 to a feedforward filter 162, which performs phase compensation principally on the leading edge of each of the 8 chips of the symbol where the signal energy and phase errors are highest. This phase compensation improves the accuracy of demodulation of the current symbol where only DFE is used. Block 168 makes a CCK symbol decision 170, as will be described later. The decision data 170 is converted back to a CCK symbol of 8 chips in block 169 and is smeared to match the original channel distortion using feedback filter 166, and is presented to the subtractor 164, which restores the leading edge of each chip of the chip stream, as was described in FIGS. 5c and 5d. In the implementation of FIG. 6, feed forward filter 162 has a small number of taps, since it is used principally to perform phase correction on the comparatively short leading edge of each chip, while the decision feedback filter 166 operates over the comparatively longer temporal range, but minimum phase region of an entire symbol by smearing the previous symbol to match the channel reflections and subtracting this smeared previous symbol from the present symbol. Together, the feedforward filter 162 and feedback filter 166 constitute a transversal filter trained to equalize the channel impulse response of the communications channel. In this manner, the feedforward filter 162 reduces symbol interference due to pre-cursor effects, the feedback filter 166 reduces symbol interference due to post-cursors from previous symbols, and the maximum likelihood estimation removes the ICI effects from the current symbol.

FIG. 7 shows a prior art implementation 190 of the CCK symbol decision block 168 of FIG. 6. Examining one of the four blocks, a simple Fast Walsh Transform (FWT) 182 operates on the incoming CCK symbol 172, and produces a complex-valued output based on transforming the incoming CCK chip 172 with a particular butterfly φ2. Each of the FWT blocks 182, 184, 186, 188 performs the Fast Walsh Transform using the incoming CCK chip and a unique butterfly value of φ2={1,j,−1,−j}, for 174, 176, 178, and 180, respectively. The output of each Fast Walsh Transform block 182, 184, 186, 188 is 16 complex values, and for the four FWT blocks 182, 184, 186, 188 in aggregate, one of the 64 outputs will have a maximum magnitude. The FWT output which is maximum magnitude will determine the CCK symbol decision, and this one of 64 selection can be decoded to generate 6 bits of data. Examining the real (I), and imaginary (Q) values from the maximum valued output will further indicate which of the four phases {1,j,−1,−j} is present, which will result in 2 additional bits of data, thereby generating an 8 bit decision data value.

FIG. 8 shows a Fast Walsh Transform (FWT) block such as one of FWT blocks 182, 184, 186, 188 of FIG. 7. CCK symbols are presented to input 222 accompanied by one of the four butterfly phases φ2={1, j, −1, −j} at input 232. The simple FWT 220 comprises a butterfly configuration of multiplying the phase φ2 232 with every alternating bit of the incoming symbol, followed by a series of adders which sum the resulting outputs after multiplication by {1,j,−1, −j}, as shown. For example, adder 226a adds b1 to b0*$e^{j\phi2}$, where $e^{j\phi2}$ is from the set {1, j, −1, −j} as was described earlier. The output of each adder 226a, 226b, 226c, 226d is multiplied by {1,j,−1,−j} according to the legend shown in FIG. 8 and these complex results are forwarded to the next stage as shown. The result of the series of additions of these results is seen in the outputs of the 16 adders 230a through 230p, only one of which will have a maximum value for a given input symbol. For a given symbol in the subset associated with a particular phase 232, one of the adder outputs 230a through 230p will have a maximum value, corresponding to the decoded symbol. When four of the simple FWT blocks 220 are provided with the same input symbol 222 and each of the four phases 232, all 64 (16*4) code symbols are available for decoding, and a decision on the set of 64 symbols is made based on the largest value at the outputs of the adders in each FWT block 220, and the phase of this output provides 2 additional bits of data.

As was described in the FIGS. 5a through 5d and FIG. 6, the decision feedback equalizer can improve the decision made on a current symbol in poor signal to noise conditions. Once the previous symbol has been decided, it can be smeared with a filter which has characteristics similar to the communications channel, and then inverted and added as symbol 151 of FIG. 5c to the current symbol 154, thereby removing the post-cursor effects of the previous symbol 150 on current symbol 154. It should also be noted that the decision feedback filter 166 may have as many taps as is required to subtract as many previous symbols from the current symbol as the taps of the filter permit. For the case of a feedback filter 166 with 16 taps, it is possible to subtract the effects of two 8 chip previous symbols which have added into the current symbol. It is also desirable to remove the intra-symbol (inter-chip interference ICI) interference of one chip smearing with another chip within a symbol, as shown in FIG. 5a. This can be done by making soft decisions on the entire symbol after subtracting the chip smearing ICI effect. FIG. 9 shows a CCK symbol demodulator which performs both decision feedback equalization (DFE) (also referred to as pre-equalization), as well as maximum likelihood symbol estimation (MLE), also referred to functionally in FIG. 9 as a post-equalizer function 312. There are many ways of realizing the general MLE and DFE functionality shown in FIG. 9, but one such realization is described in FIGS. 13 and 14 of prior art U.S. Pat. Nos. 6,690,715 and 6,233,273 by Webster et al. In FIG. 9, incoming CCK chips 286 are presented as a digital stream of complex data, sampled with approximately 6 bit data width. This complex-valued digital data may first be combined with a channel matched filter (not shown) performing rake combining, the output of which is filtered by a feed-forward filter (FFF) 288, which performs maximum phase compensation on the incoming signal, and passes the output as signal 289 to a serial-parallel converter 290, which converts the serial stream of data into framed 8 complex values, representing a current CCK symbol 291 comprising 8 CCK chips. In addition to the CCK symbol input 291, previous decision feedback symbol input 304 is provided for pre-equalization (removal of previous symbol post-cursors from the current symbol), and the output of this stage is fed to demodulator 314 which performs an FWT and current symbol subtractor 296 subtracts the 64 post-equalization symbol inputs for maximum likelihood estimates which remove intra-symbol interference ICI (shown in FIG. 5a), where the intra-symbol interference correction is generated by post-equalizer 312. Examining the decision feedback equalization path from the output 305, the previous decision data 305 is converted to a CCK symbol of 8 chips in converter 300, which produces a CCK symbol 301 corresponding to 8 complex chip phase values of I and Q as is done in CCK encoding for transmission of data. These 8 complex phase values 301 I and Q channels are passed through 8 feedback filters 302-1 through 302-8 which simulate the minimum phase and maximum delay component of the channel impulse response, as was described earlier. The length of the feedback filter 302-1 through 302-8 governs how many previous symbols of contributions may be removed from the current symbol, and in the case of a length flt_len=16 taps, a channel response function which includes signal energy bleeding from two previous CCK symbols may be subtracted from the current CCK symbol.

The output of the feedback filters 302-1 through 302-8 produce a symbol comprising 8 complex channel-equalized chip values for the previous decision 304, which are subtracted from the current symbol 291 by the previous decision subtractor 292, which subtracts the previous decision smeared symbol 304 from the current CCK symbol 291, as was described for block 164 of FIG. 6. Simplifying the operation by ignoring the effect of the current symbol subtractor 296, Fast Walsh Transform 294 converts the 8 complex values for a decision feedback equalized symbol into 64 complex outputs, from which the largest magnitude output would represent the demodulated symbol, thereby extracting 6 bits of data, and the phase position of the largest magnitude output {1,j,−1,−j} would provide an additional 2 bits of data, generating an 8 bit decision data value. Now including consideration of the operation of the post-equalizer processor 312 and current decision subtractor 296, it may be understood that the subtraction of post-cursor ICI from chips within the current symbol smearing together may be done prior to the FWT 294 in the time domain, as was done with previous decision subtractor 292, or it may be done after the FWT 294 in the phase domain, since the FWT is a linear operation. This may be done as long as the value to be subtracted is in the symbol time domain at the input of the FWT, or transformed into the phase domain if subtracted in the post-FWT phase domain. Considering further the implementation of the post-FWT current symbol subtractor 296 as shown in FIG. 9, the post-equalizer 312 provides 64 post-FWT phase domain, channel compensated symbol correction values 285 which represent corrections to all of the possible current CCK symbols in the post-FWT phase domain. These possible CCK symbol corrections 285 are presented to current symbol subtractor 296 as 64 complex values. Each of the 64 complex outputs 297 is expanded to four using 1,j,−1 and −j with index variable k 299. The biggest picker 298 has 256 complex FWT values stored for this input symbol 291, and one of the 256 values will have maximum real part. This maximum output will include the post-FWT phase domain current symbol, with the post-cursor ISI of the previous decision (shown as 150 of FIG. 5c) removed by the pre-equalizer smeared previous decision 304 which provided symbol 151 of FIG. 5c, and the ICI of the chips of the current symbol bleeding into each other removed by post-equalizer 312 outputs 285 iterated over the four values of k. The index of the largest expanded output with largest real-part would give the 8-data bit decision data.

Post-equalization value generator 312 produces the error generated by inter-chip interference (ICI) in the symbol, converts it into the post-FWT phase domain by taking the 64 CCK codewords 280-1 through 280-64, passing each of the CCK codewords through an identical feedback filter 282-1 through 282-64 which generates the ICI correction value, and each of these is passed through a correlator 284-1 through 284-64 for converting the symbol to the post-FWT phase domain. In this manner, the ICI for each possible received symbol is subtracted, cleaning up the FWT output corresponding to the current symbol compared to the other outputs, thereby generating an improved decision for the correct symbol.

OBJECTS OF THE INVENTION

A first object of the invention is a sequential CCK demodulation processor for demodulating CCK symbols into decision data, the demodulation including a post-equalization value generator for converting CCK symbols into a plurality of post-FWT phase domain ICI correction components, a decision feedback circuit including a first subtractor for subtracting previous demodulated data which has been converted into a channel smeared previous demodulated CCK symbol from a current CCK symbol, the output of the first subtractor coupled to a Fast Walsh Transform, the Fast Walsh Transform generating an output which is coupled to a second subtractor operating on the Fast Walsh Transform output and individually subtracting the plurality of ICI correction components provided by the post-equalization value generator, the second subtractor output coupled to a biggest picker for selecting the largest magnitude said second subtractor output and extracting data bits from which said second subtractor output was selected, and extracting additional data bits from the phase of the largest magnitude of the second subtractor output.

A second object of the invention is, after characterizing a channel and generating from this characterization a channel compensation including a feedforward filter part and a DFE feedback part, performing demodulation of a current CCK symbol when a previously demodulated symbol is present by subtracting a channel-compensated previous CCK symbol from the present CCK symbol to form a first subtraction value, performing a Fast Walsh Transform (FWT) on the resulting first subtraction value, and then subtracting each of the possible ICI components for all possible current CCK symbols in the post-FWT phase domain from the resulting FWT value, and choosing a maximum magnitude subtraction result from the available 256 FWT values, where the maximum magnitude subtraction result may then be converted to demodulated data.

A third object of the invention is the generation of a channel compensated decision feedback component to compensate for inter-symbol interference due to post-cursors of previous symbols adding to the present symbol, the decision feedback component generated using a shift register and the values of a compensation filter $\{C_1 \ldots C_{flt\_len}\}$, and a current chip value $\{C_1 \ldots C_{nchip}\}$.

A fourth object of the invention is the generation of an Intra-Symbol Interference, or ICI, correction component, the ICI correction component computed for all possible CCK symbols, the ICI correction component being computed using a sparse set $\{C1,C3,C5,C7\}$ from a complete coefficient set $\{C1,C2,C3,C4,C5,C6,C7,C8\}$, trained during start of the packet, the generation of the ICI correction component being done using six multipliers and an adder.

SUMMARY OF THE INVENTION

A CCK symbol demodulator demodulates an incoming current CCK symbol into current data using:

1) an iteration variable k which is varied from 0 through 3 where k also generates a $\phi 2=\{1,j,-1,-j\}$ during a given current CCK symbol, the CCK symbol comprising 8 complex chip values;

2) a post-equalization value generator for computing values stored in post-equalize registers during a preamble time. During a preamble interval, a channel characterization is performed, the channel characterization generating a channel compensation function and related channel compensation-coefficients $\{c1, c2, \ldots, c7\}$, for example, for use in a feedback filter. After these coefficients $\{c1 \ldots c7\}$ are known, a reduced set of 16 complex post-equalization register values is iteratively computed by a post-equalization value generator which uses only an iteration variable i with a range from 0 through 15 which selects one of 16 CCK phase combinations $\{\phi 2,\phi 3\}$, and a reduced set of channel compensation coefficients $\{c1,c3,c5,c7\}$ using a reduced number of multipliers and adders. The post-equalize register contains 16 values, 4 of which are associated with a particular $\phi 2$ derived from k for each $\phi 2=\{1,j,-1,-j\}$ and thereafter expanded into 16 values by multiplication by $\phi 4=\{1,j,-1,-j\}$;

3) a first subtractor which subtracts the effects of previous CCK symbols from the present symbol to generate a first subtractor output;

4) a pre-equalization register containing a value which includes the channel compensated effects of previous decision symbols for removing previous symbol contributions from the current symbol;

5) a demodulator having as inputs the first subtractor output, a phase $\phi 2$ derived from the iteration variable k, the four values of the post-equalization register associated with the phase $\phi 2$ derived from k which were expanded into 16 post-equalize values as described earlier, where the output of the first subtractor is applied to a simple FWT, the simple FWT performing an FWT on the first subtraction output using as a butterfly phase the $\phi 2$ which was derived from the iteration variable k, thereby producing 16 FWT outputs. The 16 FWT outputs are presented to a second subtractor, which subtracts from the 16 FWT outputs the 16 post-equalize values that were computed in step 1 for a given iteration variable k. These 16 post-equalize register values contain values the ICI contribution assuming that the corresponding symbol was the one transmitted, and the second subtractor output, is presented to a demodulator biggest picker 374, which chooses the largest magnitude value from the plurality m of complex values. The maximum complex value MAX(k), which is the largest value for the iteration k, is stored along with which OUTPUT(m) of the plurality m of subtractor outputs contained this MAX(k). Both values MAX(k) and OUTPUT(m) are required to generate the decision data.

4) a final biggest picker, which selects the largest magnitude value from the set {MAX(O).MAX(3)} and associated {OUTPUT(0) ... OUTPUT(3)}. The current data 384 of 8 bits is formed from the final biggest picker with 2 bits derived from which iteration k had the maximum value MAX(k), 4 bits from the OUTPUT value for the case where m=16, and 2 bits from the phase of the largest amplitude. After the current data is determined using this method, a new current symbol is presented to the demodulator, and the current data becomes previous data for the next cycle.

5) a pre-equalize register value generator, which uses the previous data from the biggest picker to convert the previous data into a previous CCK symbol, smear the data using a feedback filter and the channel compensation coefficients to populate the pre-equalization register values.

BRIEF DESCRIPTION OF THE DRAWINGS

FIG. 1 shows a dibit phase encoding for CCK.

FIG. 2 shows the encoding of 8 bits of data into four phase variables using four encoders as shown in FIG. 1.

FIG. 3 shows the CCK symbol generation from the four phase variables of FIG. 2.

FIG. 4 shows the block diagram of a wireless receiver including a front end, A/D converters, a phase corrector, symbol synchronization, and CCK decision demodulator.

FIGS. 5*a* through 5*e* show the time domain waveforms for a sequence of CCK symbols passing through a receiver incorporating Decision Feedback Equalization (DFE) and Maximum Likelihood Estimation (MLE).

FIG. 6 shows the block diagram for a CCK demodulator using Decision Feedback Equalization (DFE).

FIG. 7 shows the block diagram for a CCK symbol decision function.

FIG. 8 shows the block diagram for a simple Fast Walsh Transform (FWT) Butterfly which takes the CCK symbol and iteration variable φ2 as inputs and gives 16 complex correlated outputs.

FIGS. 10*a* through 10*h* shows the waveforms for a current symbol with a previous symbol and next symbol subtracted, in accordance with the block diagram of FIG. 11*a*.

FIG. A-1 is a digital signal processing multiply-accumulate processing chart showing the effect Intra-Codeword inter-symbol interference on a current symbol.

FIG. A-2 shows the shifted auto-correlation result of correlating a CCK codeword with itself.

FIG. B-1 shows a digital signal processing multiply-accumulate processing chart showing the effect of Inter-Codeword inter-symbol interference on a current symbol.

DETAILED DESCRIPTION OF THE INVENTION

Figure 9:
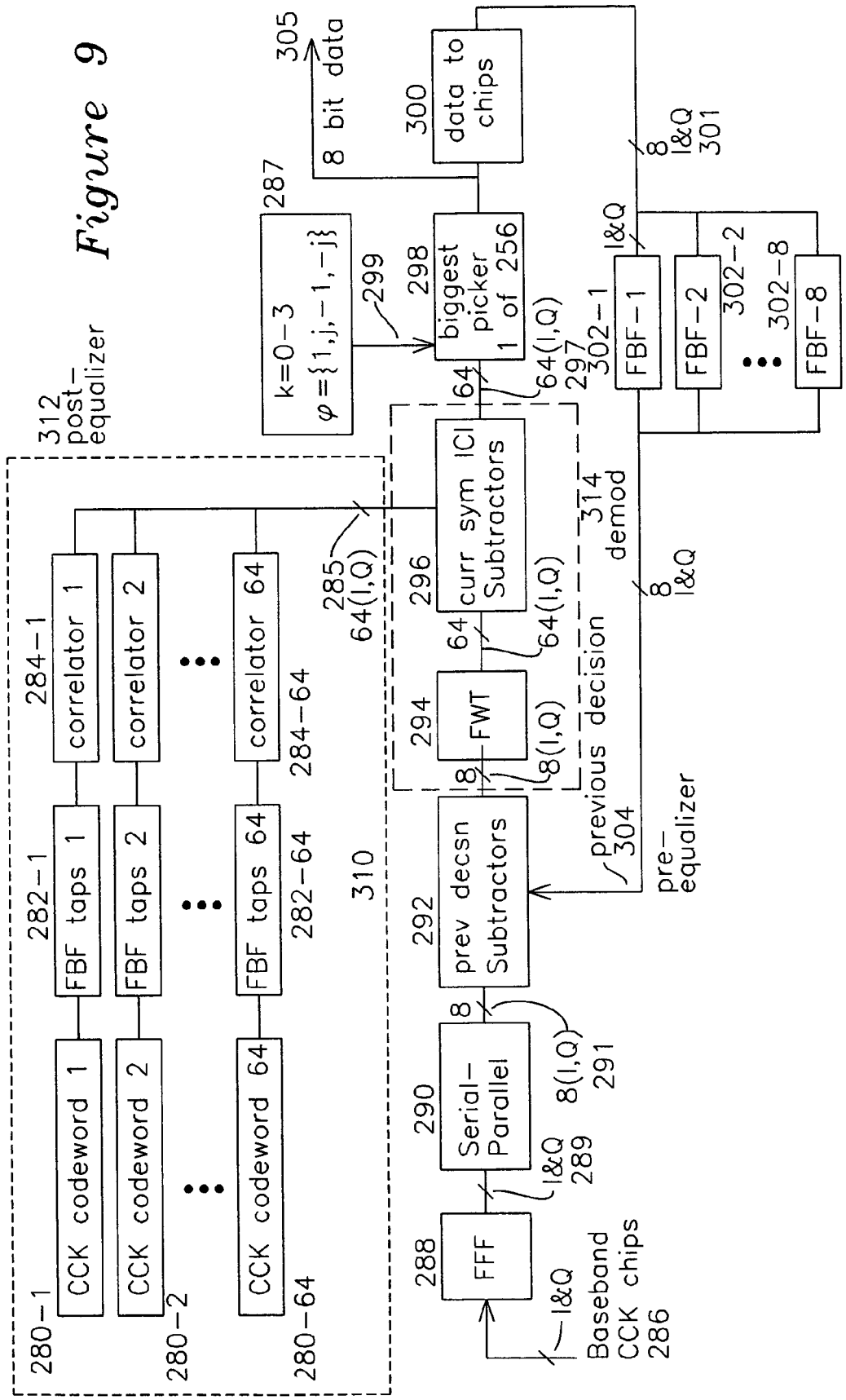
FIG. 9 shows the block diagram for a CCK symbol demodulator including Decision Feedback Equalization and Maximum Likelihood Estimation of a current CCK symbol.

The approach as shown in FIG. 9 describes the advantages of using decision feedback equalization for removing inter-codeword ISI by estimating current symbol ICI and subtracting it to improve the decision on the current symbol. An implementation of the circuitry in FIG. 9 would entail a very extensive set of multipliers and adders. Each of the 64 feedback filters 282-1 through 282-64 would require approximately many adders and multipliers, and each of the correlators 284-1 through 284-64 would require many adders and multipliers. The 16 feedback filters 302-1 through 302-8 each require many adders and multipliers, and the current symbol subtractor 296 requires 64 simultaneous complex subtractions.

Figure 10A:
Figure 10B:
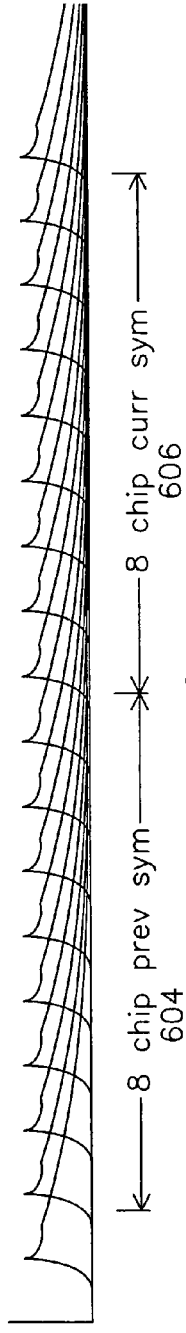
Figure 10C:
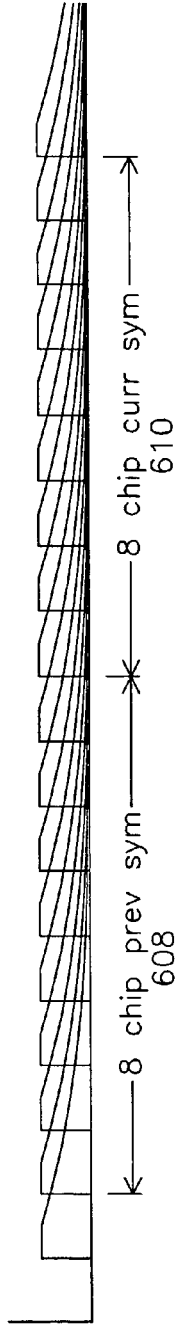
Figure 10D:
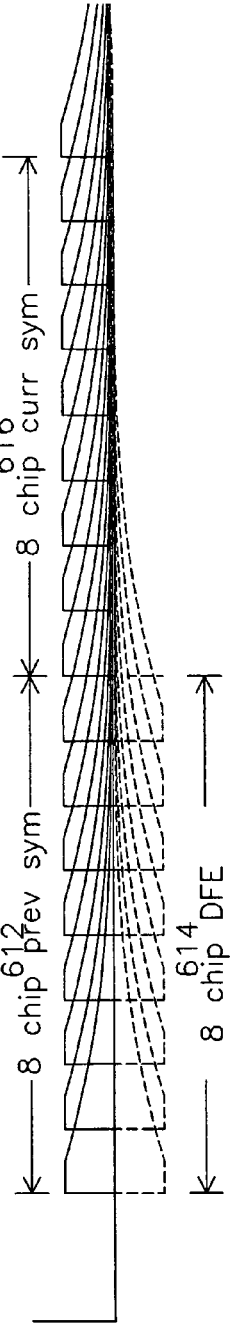
Figure 11A:
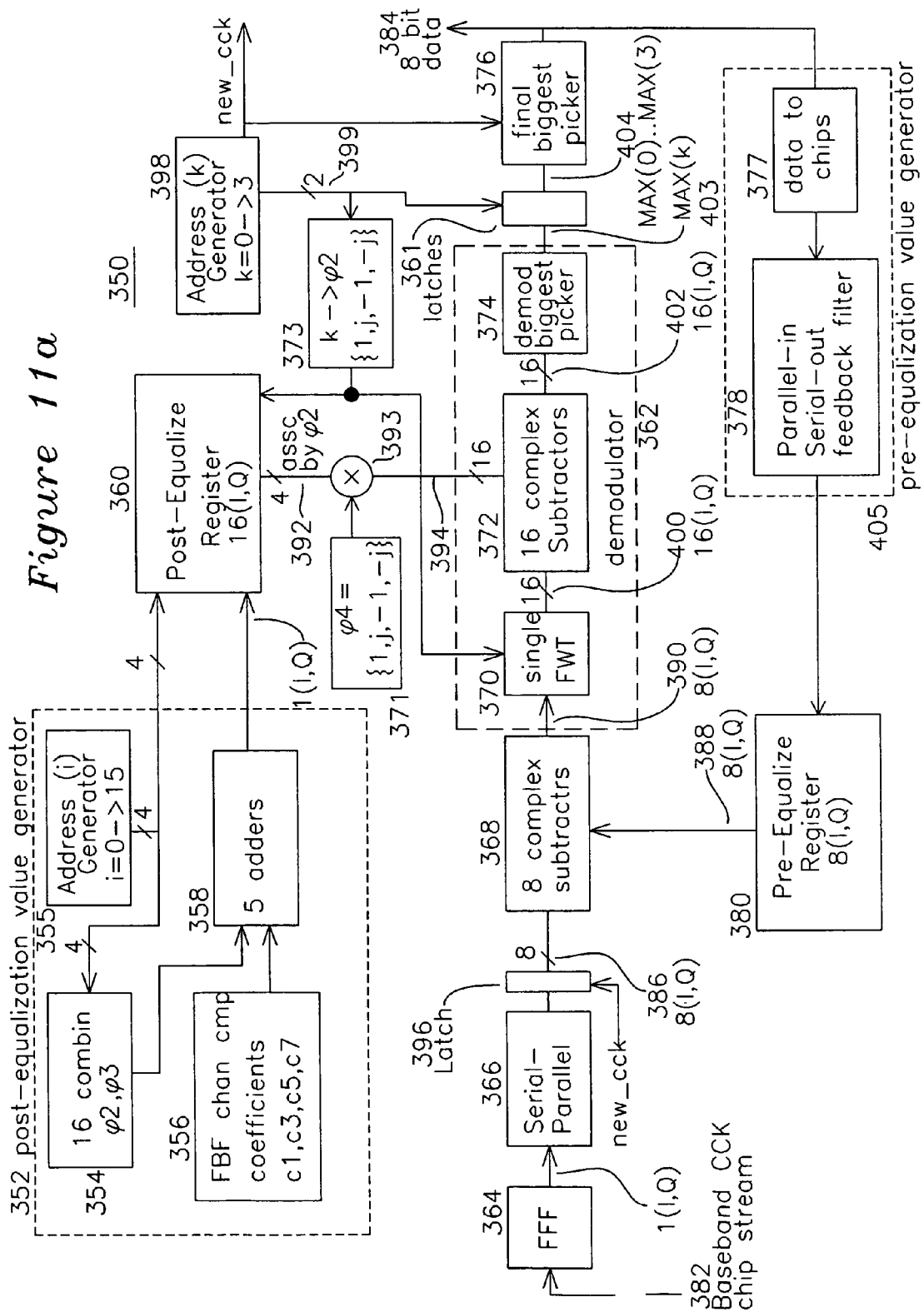
FIG. 11*a* shows a CCK symbol demodulator according to the present invention.

FIG. 11*a* shows the block diagram for a reduced complexity CCK demodulator including decision feedback equalization for pre-equalization as well as for post-equalization, and may be understood in combination with the operating waveforms of FIGS. 10*a*-10*f*. It is understood that the waveforms of FIGS. 10*a*-10*f* are for illustrative purposes, as the signals of the actual system are typically digitized samples with real and imaginary components. FIG. 10*a* shows an 8 chip symbol 600, etc convolved with a channel impulse response 602 to produce the baseband chip stream shown in FIG. 10*b*, which is applied to the input 382 of FIG. 11*a*. It can be seen that that chip stream of FIG. 10*b* includes a current symbol 606 with previous symbol 604 signal adding in to generate ISI, and there is also ICI within the current chip from adjacent intra-symbol smearing. Incoming baseband CCK chip stream 382, also shown in FIG. 10*b*, is provided as a quadrature stream of unframed complex signals (I,Q) to Feed Forward Filter 364, which performs short term pre-cursor ISI correction to compensate for the channel response, using feedforward coefficients derived from the preamble interval of the packet. The feedforward filter 364 performs maximum phase corrections, and reduces- pre-cursors, as shown in the waveform of FIG. 10*c*. For clarity, FIG. 10*c* through FIG. 10*f* are shown as a sequential series of samples, although the processing is performed on blocks of 8 chips as symbols. During the preamble period, and before CCK symbols begin to arrive in the stream 382, the channel characterization is done which generates channel compensation coefficients {c1 ... c7}, where these coefficients are suitable for use in a feedback filter. Once these coefficients are known, it is possible to populate the Post-Equalization register 360 and initialize the coefficients of the parallel-in Serial-Out feedback filter 378 of the pre-equalization value generator, as will be described in detail later. The training of pre-equalization value coefficients {c1-c7} used for DFE occurs from the interval starting with the short (56 us) or long (128 us) preamble, the 16 us start of frame delimiter, through the header of length 22 us or 46 us depending on packet type. The calculation of post-equalization register values occurs thereafter in roughly 2 us. When the preamble period has ended, a stream of CCK chips arrives from the phase corrector as was described for FIG. 4, and is applied to the feedforward filter 364, which performs short term pre-cursor ISI corrections shown in the current symbol 610 and previous symbol 608 waveform of FIG. 10*c*. The output of the FFF 364 is applied to the serial to parallel converter 366, which groups the incoming serial data stream into a current symbol 386 comprising 8 complex chip values to be demodulated, and the current symbol 386 is stored in latch 396. The symbol is applied to a complex first subtractor 368, which subtracts a channel-equalized previous symbol 388 stored in pre-equalization register 380 from the current symbol 386. The contents of the pre-equalization register 380 are shown in FIG. 10d as 614, which is an inverted form of previous symbol 612. The output 390 of the first subtractor 368 is shown as symbol 616 of FIG. 10d, which is now free of previous symbols, and only contains ICI interference from the adjacent chips in the symbol. For each first subtractor 368 output 390, the demodulator 362 performs the same operation four times, using the first subtractor output 390, an FWT phase $\phi 2$ generated by the iteration variable k 399, a previous CCK symbol stored in pre-equalization register 380, and 16 possible post-cursor ICI values 394 generated by multiplying the contents of post equalization register 360 associated with that $\phi 2$ by fours phase value $\phi 4 = \{1, j, -1, -j\}$. As was described earlier, the multiplication of a value a+jb by $\{1, j, -1, -j\}$ results in the trivial remapping real and imaginary values into $\{a+jb, -b+ja, -a-jb, b-ja\}$. The output 390 of the first subtractor 368 represents the current CCK symbol with the previous CCK symbol subtracted out, as shown in symbol 616 of FIG. 10d. The output 390 of the first subtractor 368 is presented to a simple FWT 370 as described in FIG. 8, accompanied by the FWT phase $\phi 2$ generated by the current iteration k 399. The output of the FWT 370 is 16 complex values. When the iteration value k 399 generates all four values, this produces all 64 complex FWT values, as was done at block 294 of FIG. 9. FWT output 400 will have one of m outputs with a maximum magnitude for one of the four iterations k, and for the case of the simple FWT 370, there are 16 complex outputs. Since the FWT function 370 is a linear operation, it is possible to remove the effect of the ICI due to smearing of chips within the current symbol by using the communication channel response and computing ICI corrections for all 256 possible CCK codewords (or symbols), transforming them to the post-FWT phase domain, and subtracting this ICI effect from the FWT 370 output. Although the subtraction is done in the post-FWT domain, reference FIGS. 10e and 10f show the effect of performing these ICI subtractions as if there were done in the pre-FWT domain, in order to show continuity of relationship to pre-FWT domain FIGS. 10a through 10d. As described earlier, the FWT is a linear operation, allowing ICI to be subtracted in the pre-FWT domain as shown in the waveforms of FIGS. 10e and 10f. For the block diagram of FIG. 11a, the ICI correction is performed in the post-FWT domain as shown in FIG. 10g with solid lines representing a particular FWT 370 output response to a particular CCK symbol as one input to the second subtractor 372 and the dashed lines representing the second subtractor ICI compensation input from the post-equalizer for a particular CCK symbol. In FIG. 10h, the output FWT-1 corresponds to the current CCK codeword, and subtracting ICI generates the improvement in decision for the associated CCK codeword as shown by comparison to output FWT-1 of FIG. 10g. Second subtractor 372 performs a subtraction of post-cursor ISI effect by multiplying 393 each of the 4 complex values of the post-equalization register 360 corresponding to the phase $\phi 2$(FWT butterfly number) with 4 possible $\phi 4$ 371 values, and subtracting the 16 complex values from this multiplication 393 from the output of FWT 370, which also comprises 16 complex values. The second subtractor 372 output 402 of 16 complex values is presented to demodulator biggest picker 374, which selects one of the 16 outputs having the largest magnitude, and passes along as an output the biggest magnitude complex value as MAX, accompanied by the particular output of the 16 which carried this value as the value OUTPUT. FIG. 10f shows the effect of subtracting the ICI from the current codeword in the time domain (shown for clarity as if the second subtractor 372 were performed pre-FWT), as the cleaned-up symbol in the 8 chip block would correspond to a single maximum value in the post-FWT phase domain. In the post-FWT domain of second subtractor 372, FIG. 10g shows the FWT output as thick lines, the post equalization register outputs 394 as dashed lines, and FIG. 10h shows the resulting second subtractor outputs 402 for the case where output FWT-1 is the maximum response output. As stated earlier, the linearity of the FWT allows either subtraction of phase-domain post-equalization values post-FWT, or subtraction of time domain post-equalization values pre-FWT to compensate for ISI. In this manner, and for all values of k=0-3, the final biggest picker 376 selects the largest magnitude value which includes the effects of pre-cursor ISI and post-cursor ICI cancellation, and generating decision data 384 as described earlier. At the end of each demodulation cycle, address generator 398 asserts signal NEW_CCK, which resets k=0, latches the new current symbol 386, latches the decision data 384 as previous data, which is used to reload pre-equalization register 380 before the next data decision iteration for k=0 begins.

Figure 11B:
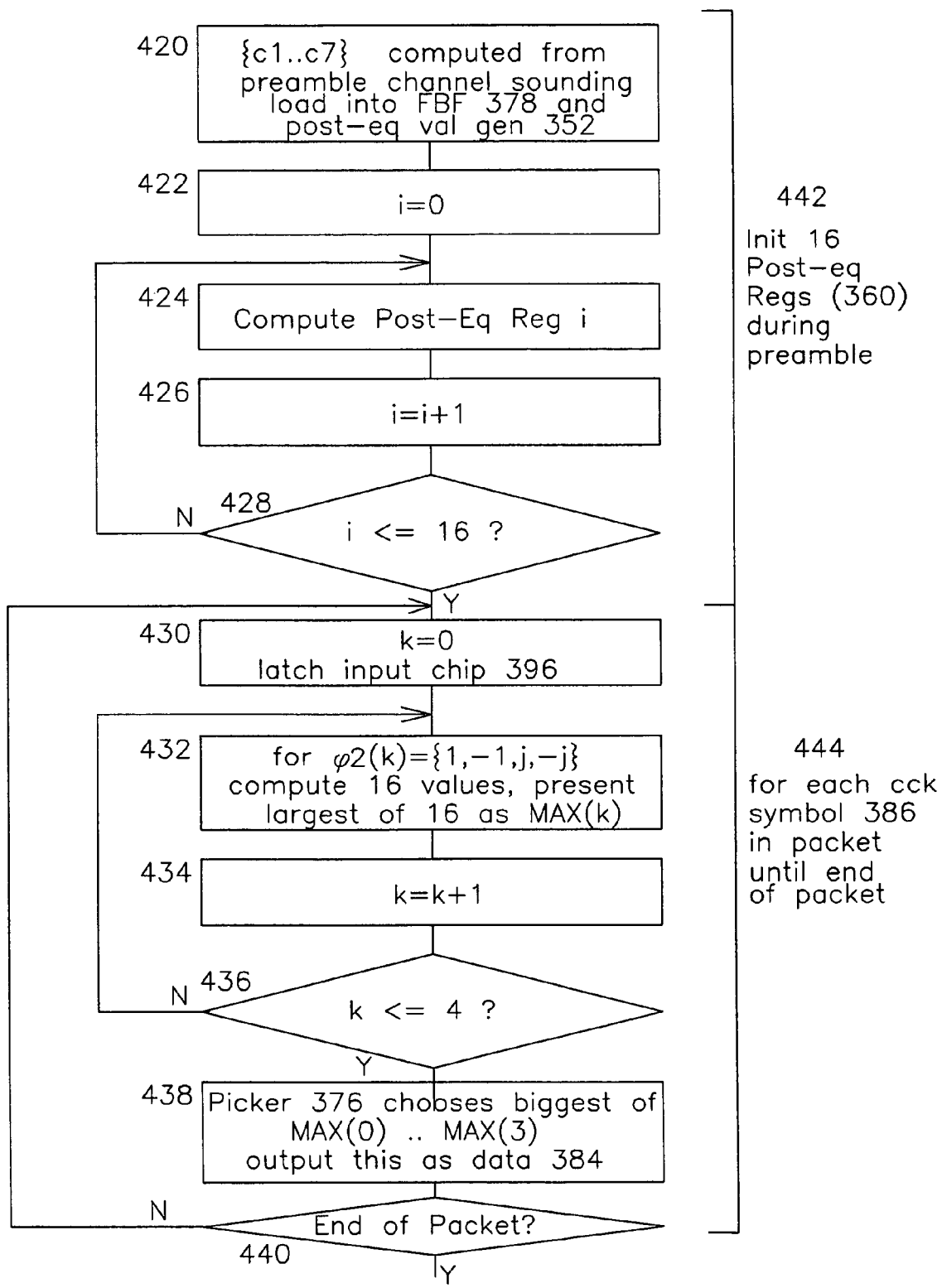
FIG. 11*b* shows a flowchart showing the iterative operation of the block diagram of FIG. 11*a*.

FIG. 11b describes the sequence of operation of the block diagram of FIG. 11a. During the preamble interval of the incoming packet, sequence 442 is performed once, and when each current CCK symbol 386 is presented in FIG. 11a, sequence 444 is performed for each CCK symbol through the last CCK symbol of the packet. During the preamble sequence 442, the feedback filter coefficients $\{c1, c3, c5, c7\}$ are characterized and computed using decision feedback equalization. These filter coefficients describe the coefficients which perform the same smearing as the communications channel, so that the symbol corrections fed back for pre-equalization and for post-equalization include the effect of the channel. After the coefficients $\{c1 \ldots c7\}$ are known, they are loaded into parallel-in serial-out feedback filter 378, as will be described later. The coefficient subset $\{c1, c3, c5, c7\}$ are loaded into block 356 of FIG. 11a. The post equalization value generator 352 initializes iteration variable i=0 in step 422, and computes each of the 16 post-equalization register values in steps 424, 426, and 428. When all 16 registers are initialized, the post-equalization register 360 of FIG. 11a is fully populated, and the demodulator is ready to start decoding CCK symbols using the contents of post-equalization register 360. Sequence 444 shows the process of demodulation for each current CCK symbol presented in step 430 and iteration variable k=0. In step 432, each value of k is associated with four corresponding $\phi 2$ values read from the Post equalize register, which are expanded by multiplication by $\phi 4$ to produce the set of 16 complex values that are subtracted from 16 complex FWT outputs at the second subtractor outputs 402. As described earlier, the biggest picker 374 of FIG. 11a selects the largest value MAX, and also passes along the value OUTPUT which identifies which largest output was selected. This process repeats with incrementing values of iteration variable k, as shown in steps 434 and 436. When all four iterations are complete, final biggest picker 376 chooses the biggest of MAX(0) through MAX(3), and its associated OUTPUT(0) through OUTPUT(3), as was described earlier. In step 440, the process exits for end of packet, or continues for the balance of the packet with the next current CCK symbol.

The appendix shows the derivation of equations used for the post-equalization generator, and make use of the symmetries found in CCK chip codes. The 16 post equalization register values $Reg_i$ are found to be:

$$Reg_i = (-C_1 e^{-j(\phi2+\phi3)} + 2C_3 e^{(-j\phi2)} + C_3 e^{j(\phi2-\phi3)} + 2C_5 e^{j(\phi2)} + C_5 e^{j(\phi3-\phi2)} + C_7 e^{j(\phi2+\phi3)})$$ (Equation A of Appendix)

Second Subtractor Input=$e^{j\phi4}$ (Reg$_i$)

Where Reg$_i$ is the value stored in the ith register 360, and i is the iteration variable generated by 355 of FIG. 11a;

Second Subtractor Input is 394 of FIG. 11a;

{C1,C3,C5,C7} are the coefficients derived from the preamble training sequence.

and the overall phase term $e^{j\phi4}$ is realized by multiplication 371 by the four phases derived from $\phi4$ 399.

Figure 12:
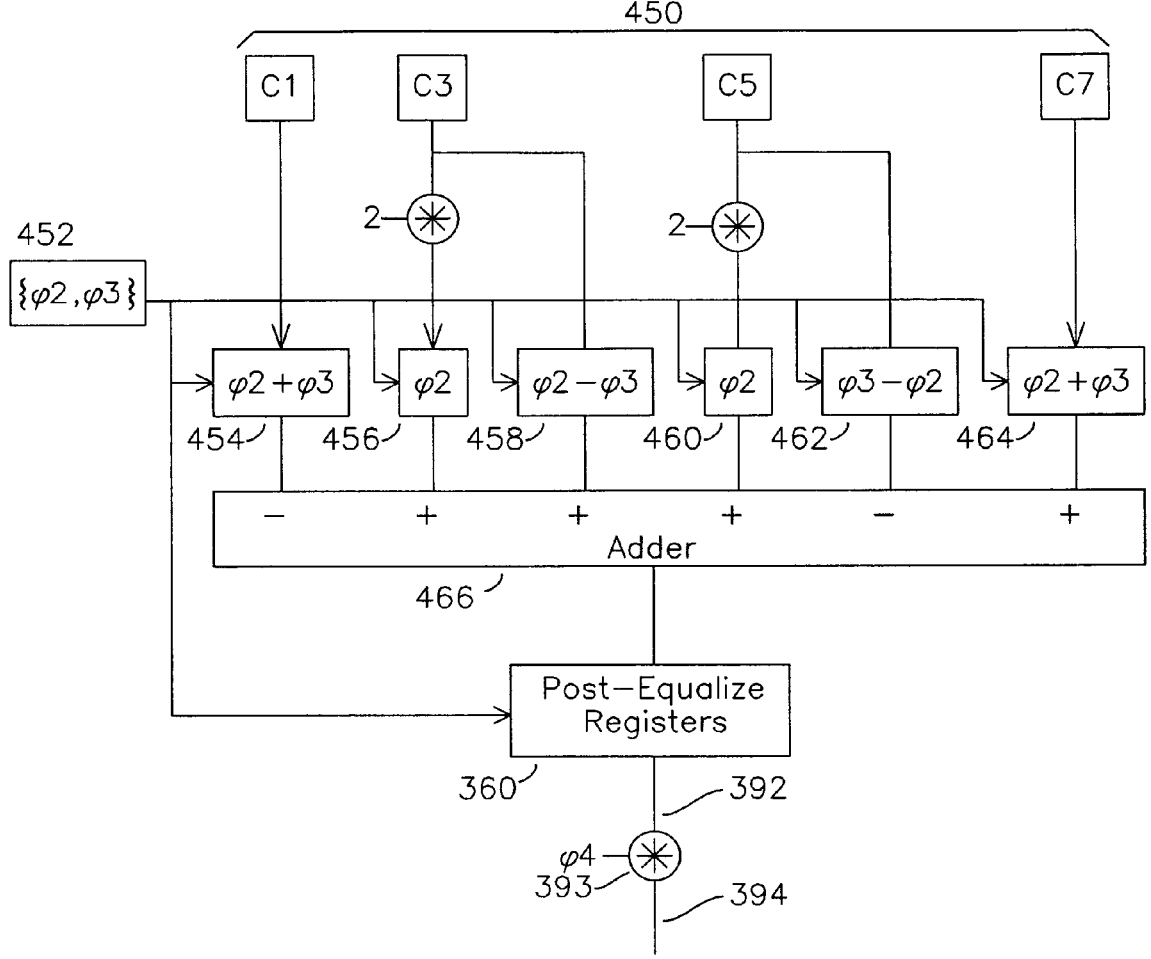
FIG. 12 shows a block diagram for the post-equalization value generator of FIG. 11*a*.
Figure 12A:
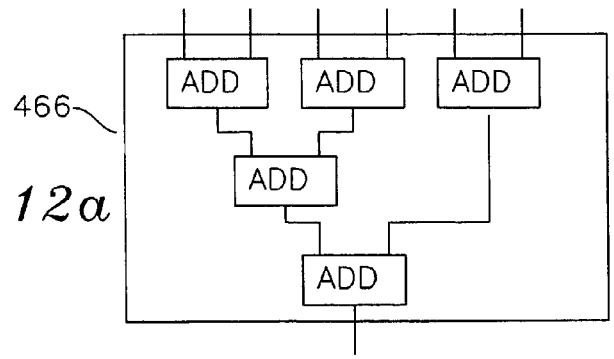
FIG. 12*a* shows a detail block diagram of the adder of FIG. 12.

FIG. 12 shows the detail of the implementation of the above equation 1 in the post equalization value generator 352 of FIG. 11a. The coefficients {C1,C3,C5,C7} 450 are initialized, after which the 16 combinations of the phases 452, corresponding to block 354 of FIG. 11a, are generated and each term is multiplied by some combination of the phases {$\phi2,\phi3$} 452. As described earlier, a multiplication by a phase term as shown in 454, 456, 458, 460, 462, 464 is actually a remapping and/or negation of real and imaginary components, as is known in the art, and the multiplication by the factor 2 for terms C3 and C5 is accomplished by left shifting the bits of the coefficients C3 and C5 by one position. Post equalization registers 360, register values 392 prior to multiplication 393, and after multiplication 394 are shown to match the reference numerals of FIG. 11a for clarity. FIG. 12a shows an implementation of adder 466, which is formed from a plurality of 2 input adders. Subtraction is realized by inverting the term prior to presentation to the adder, as is known to one skilled in the art.

Referring to the appendix for pre-equalization register generator equation derivations, it can be seen that equation B shows the equation for calculation of the ISI effect due to post-cursors of one codeword on the codewords that follow using a feedback filter 378 in FIG. 11a, and is reproduced below:

$$P_{i,j} = \sum_{u=1}^{j-1} k_{i,u}^c c_{(j-u)} \text{(Equation B) for } j = 1 \text{ to } m$$

where Qj is the post-cursor ISI effect to be stored in pre-equalize register 380 of FIG. 11a;

$C_u$ are the channel compensation coefficients as described earlier;

$r_{(vm+j)-u}$ are the previous CCK chip values.

Figure 13:
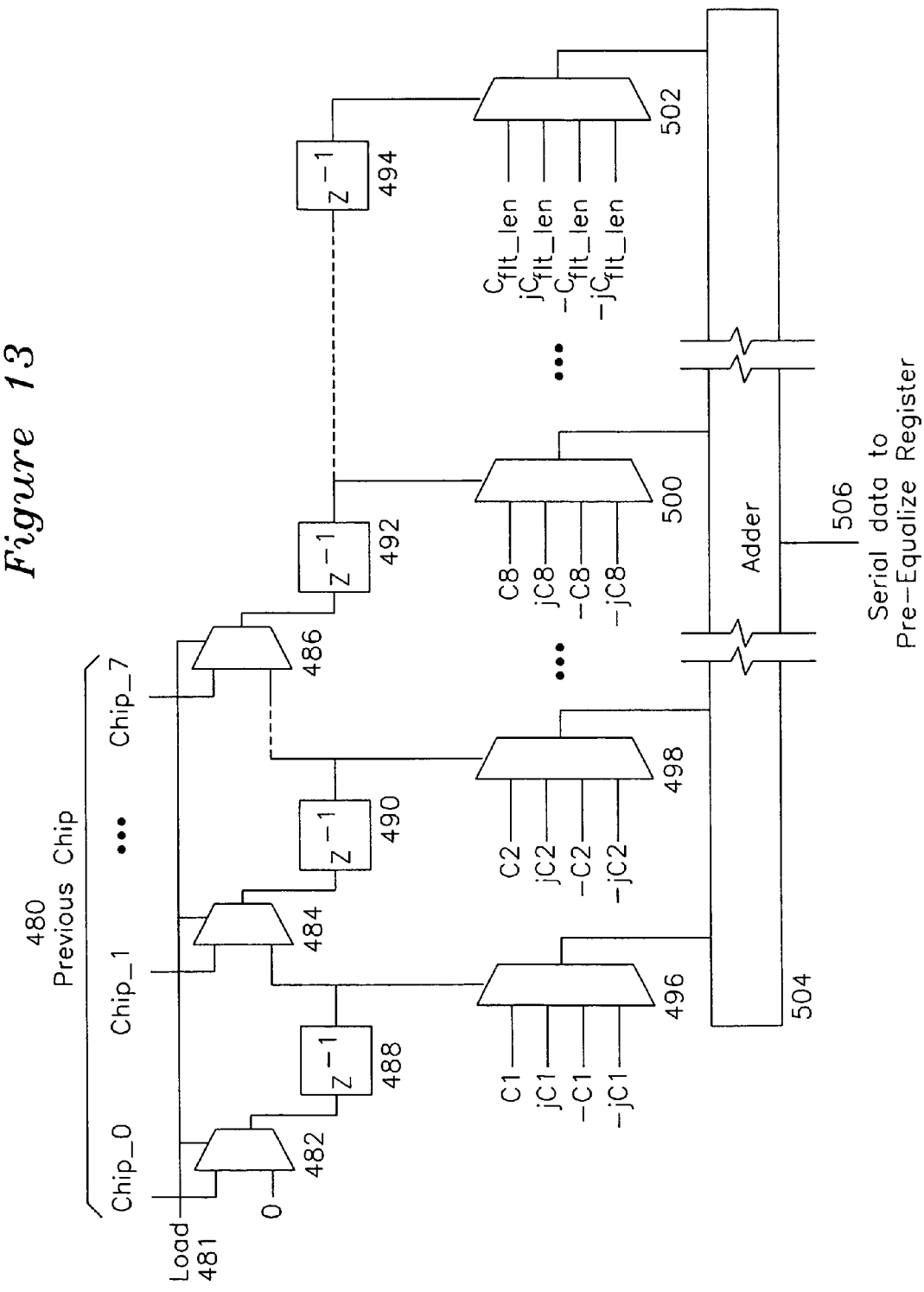
FIG. 13 shows a block diagram for the parallel-in serial out feedback filter of FIG. 11*a*.

FIG. 13 shows one implementation of the parallel-in serial-out feedback filter 378 of FIG. 11a. Previous data 384 of FIG. 11a is converted to a CCK symbol in converter 377 of FIG. 11a, and loaded as a parallel value in input 480 of FIG. 13 with the signal Load 481 asserted, which copies these values into registers 488, 490 through 492. The coefficients C1 through $C_{flt\_len}$ were loaded into a coefficient register (not shown) during the preamble interval, and the four phases of those coefficients is selected by the phase of the outputs of each register 488, 490 . . . 492 . . . 494, and a serial output stream at adder 504 produces a serial version of the data to be loaded into pre-equalize register 380 of FIG. 11a. The previous symbol 480 is updated at the end of each decision. Many variations of multiplications by phase terms can be accomplished using multiplexers as shown in FIG. 13, or as a multiplier as shown in FIG. 11a.

While specific examples for the elements of the CCK processor are shown for clarity, these examples are not intended to limit the invention, but to assist in understanding the operation.

APPENDIX

Derivations of Equations for Post Equalization and Pre-Equalization

Consider the data stream $s_i$ ($s_1$ being transmitted first in time), which gets corrupted by a multipath channel, which can be modeled as a linear FIR filter. Now the corrupted stream $r_i$ is received and has to be equalized. In DFE architecture the Feedback Filter (FBF) removes the post-cursors. Let us consider that we have a trained FBF with coefficients $c_i$ (i=1 to FILTER_LEN), where $c_i$ represents the effect of $s_{(j-i)}$ on $s_j$. The FBF removes the effect of $s_{(j-FILTER\_LEN)}$ to $s_{(j-1)}$ on $s_j$. In this approach we use $r_i^d$, the decision on $r_i$, as an estimate of $s_i$. This decision if taken at the output of the correlators would give a certain improvement in performance under noise. Below we derive the equations for post-cursor removal in the case of Block Decision using a Correlator for the general case, and extend it to the CCK modulation case.

While using block demodulation cancelling the post-cursor effect of chips in the same codeword becomes a problem because the decisions are not yet available. Hence we have to use the Maximum Likelihood approach. That is if we have n-codewords in a multi-codeword modulation system (like we have 256 in case of CCK) and if we have n-correlators, then at the input of each correlator we cancel the effect of post-cursors (due to chips in the same codeword symbol), assuming that the particular symbol was the one that was transmitted. This condition is:

If $k_1$ to $k_n$ are the codewords in the system. And if there are m-chips to a codeword, that is, the $i^{th}$ codeword is $k_{i,1}$ to $k_{i,m}$. Then at the input of the $i^{th}$ correlator the effect of post-cursors due to chips in the same codeword is given by:

$$P_{i,j} = \sum_{u=1}^{j-1} k_{i,u} c_{(j-u)} \text{ for } i = 1 \text{ to } n: j = 1 \text{ to } m;$$ (Equation 1)

Where $P_{i,j}$ is the effect of post-cursors on the $j^{th}$ chip of the $i^{th}$ codeword, in other words it is the intra-codeword post-cursor contribution to be subtracted from the $j^{th}$ input to the $i^{th}$ correlator.

Hence, the m inputs to the $i^{th}$ correlator will now be ($r_{i,j}$-$P_{i,j}$), and its output will be:

$$M_i = \sum_{j=1}^{m} (r_{i,j} - P_{i,j}) k_{i,j}^* \text{ for } i = 1 \text{ to } n;$$ (Equation 2)

The correlator with the maximum output will determine the decision taken on the received codeword. When we expand the above equation we get the following equation for post-equalization:

$$M_i = \sum_{j=1}^{m} r_{i,j} k_{i,j}^* - \sum_{j=1}^{m} P_{i,j} k_{i,j}^* \text{ for } i = 1 \text{ to } n;$$ (Equation 3)

$$= Rcorr_i - Pcorr_i$$

This equation shows that we can first correlate the incoming stream with the 256 codewords to get $Rcorr_i$ and then from the output stream of each correlator we can subtract the corresponding Pcorr$_i$ (i.e., correlated P$_{i,j}$). But this method is extremely hardware intensive. Let us look at the inherent symmetry of CCK codewords to reduce the complexity.

Calculation of P$_{i,j}$ and Pcorr$_i$ for the case of CCK Modulation

The 256 CCK codewords are given by the formula:

$$k_i^c = [e^{j(\phi_1+\phi_2+\phi_3+\phi_4)}, e^{j(\phi_1+\phi_3+\phi_4)}, e^{j(\phi_1+\phi_2+\phi_4)}, -e^{j(\phi_1+\phi_4)},$$
$$e^{j(\phi_1+\phi_2+\phi_3)}, e^{j(\phi_1+\phi_3)}, -e^{j(\phi_1+\phi_2)}, e^{j(\phi_1)}]$$

$$k_i^{nc} = [e^{j(\phi_1+\phi_2+\phi_3+\phi_4)}, e^{j(\phi_1+\phi_3+\phi_4)}, e^{j(\phi_1+\phi_2+\phi_4)}, e^{j(\phi_1+\phi_4)},$$
$$e^{j(\phi_1+\phi_2+\phi_3)}, e^{j(\phi_1+\phi_3)}, e^{j(\phi_1+\phi_2)}, e^{j(\phi_1)}]$$

for $i=1$ to 256; i.e., $\forall\, \phi_1,\phi_2,\phi_3,\phi_4 \in \{1, j, -1, -j\}$ (Equation 4)

We can see that here n=256 and m=8 as defined previously. For $k_i^c$ the fourth and seventh symbols are negated (cover code inserted), whereas $k_i^{nc}$ are codewords without cover $$P_{i,j} = \sum_{u=1}^{j-1} k_{i,u}^c c_{(j-u)} \text{ for } i = 1 \text{ to } 256; \quad j = 1 \text{ to } 8 \quad \text{(Equation 5)}$$

$$P_{corr_i} = \sum_{j=1}^{8} P_{i,j} k_{i,j}^{nc*} \text{ for } i = 1 \text{ to } 256; \quad \text{(Equation 6)}$$

First we substitute equation-4 into equation-5, and then we substitute equation-4 and 5 into equation-6. Then simplifying we find that many terms get cancelled due to the symmetry of CCK code set and we finally get the reduced equation as:

$$P_{corr_i} = e^{j\phi_4}(-c_1 e^{-j(\phi_2+\phi_3)} + 2c_3 e^{-j\phi_2} + c_3 e^{j(\phi_2-\phi_3)} +$$
$$2c_5 e^{j(\phi_2)} - c_5 e^{j(\phi_3-\phi_2)} + c_7 e^{j(\phi_2+\phi_3)})$$

for $i=1$ to 256; i.e. $\forall \phi_1,\phi_2,\phi_3,\phi_4 \in \{1, j, -1, -j\}$ (Equation A)

Derivation of the P$_{corr_i}$ Equation A is as shown below Alternate Notation:

$e^{j(\phi_1+\phi_2+\phi_3+\phi_4)} = \{1,2,3,4\}$
$e^{j(\phi_1+\phi_3+\phi_4)} = \{2,3,4\}$
$e^{j(\phi_1+\phi_2+\phi_4)} = \{1,2,4\}$
$e^{j(\phi_1+\phi_4)} = \{1,4\}$
$e^{j(\phi_1+\phi_2+\phi_3)} = \{1,2,3\}$
$e^{j(\phi_1+\phi_3)} = \{1,3\}$
$e^{j(\phi_1+\phi_2)} = \{1,2\}$
$e^{j(\phi_1)} = \{1\}$ {c1,c2,c3,c4,c5,c6,c7} Channel equalization coefficients $P_0 = 0$ $P_1 = C_1\{2\}$ $P_2 = \{C_1\{1, 3, 4\} + C_2\{1, 2, 3, 4\}\} \cdot \{1, 2, 4\}^*$
$= C_1\{1, 3, 4\}\{1, 2, 4\}^* + C_2\{1, 2, 3, 4\}\{1, 2, 4\}^*$
$= C_1\{3, -2\} + C_2\{3\}$ $P_3 = -\{C_1\{1, 2, 4\} + C_2\{1, 3, 4\} + C_3\{1, 2, 3, 4\}\} \cdot \{1, 4\}$
$= -C_1\{2\} - C_2\{3\} - C_3\{2, 3\}$ $P_4 = \{-C_1\{1, 4\} + C_2\{1, 2, 4\} + C_3\{1, 3, 4\} +$ $C_4\{1, 2, 3, 4\}\} \cdot \{1, 2, 3\}^*$
$= -C_1\{-2, -3, 4\} + C_2\{-3, 4\} + C_3\{-2, 4\} + C_4\{4\}$ $P_5 = \{C_1\{1, 2, 3\} - C_2\{1, 4\} + C_3\{1, 2, 4\} +$
$C_5\{1, 2, 3, 4\}\} \cdot \{1, 3\}^*$
$= C_1\{2\} - C_2\{-3, -4\} + C_3\{2, -3, 4\} + C_4\{4\} + C_5\{2, 4\}$ $P_6 = -\{C_1\{1, 3\} + C_2\{1, 2, 3\} - C_3\{1, 4\} + C_4\{1, 2, 4\} +$
$C_5\{1, 3, 4\} + C_6\{1, 2, 3, 4\}\} \cdot \{1, 2\}^*$
$= -C_1\{-2, 3\} - C_2\{3\} + C_3\{-2, 4\} + C_4\{4\} -$
$C_5\{-2, 3, 4\} - C_6\{3, 4\}$ $P_7 = \{-C_1\{1, 2\} + C_2\{1, 3\} + C_3\{1, 2, 3\} - C_4\{1, 4\} +$
$C_5\{1, 2, 4\} + C_6\{1, 3, 4\} + C_7\{1, 2, 3, 4\}\} \cdot \{1\}^*$
$= -C_1\{2\} + C_2\{3\} + C_3\{2, 3\} - C_4\{4\} + C_5\{2, 4\} +$
$C_6\{3, 4\} + C_7\{2, 3, 4\}$ $Pcorr_1 = P_0 + P_1 + P_2 + P_3 + P_4 + P_5 + P_6 + P_7 + P_8$
$= 0 + C_1\{2\} + C_1\{3, -2\} + C_2\{3\} -$
$C_1\{2\} - C_2\{3\} - C_3\{2, 3\} - C_1\{-2, -3, 4\} +$
$C_2\{-3, 4\} + C_3\{-2, 4\} + C_4\{4\} + C_1\{2\} -$
$C_2\{-3, -4\} + C_3\{2, -3, 4\} + C_4\{4\} + C_5\{2, 4\} + -C_1\{-2, 3\} -$
$C_2\{3\} + C_3\{-2, 4\} + C_4\{4\} - C_5\{-2, 3, 4\} - C_6\{3, 4\} +$
$-C_1\{2\} + C_2\{3\} + C_3\{2, 3\} - C_4\{4\} + C_5\{2, 4\} +$
$C_6\{3, 4\} + C_7\{2, 3, 4\}$
$= -C_1\{-2, -3, 4\} + 2C_3\{-2, 4\} + C_3\{2, -3, 4\} + 2C_5\{2, 4\} -$
$C_5\{-2, 3, 4\} + C_7\{2, 3, 4\}$ Several observations that can be made from this reduction:
1. The ISI due to post-cursors of a codeword on the chips of the same codeword does not depend on $c_2$, $c_4$, $c_6$. This is because of the zero "shifted auto-correlation" of CCK codewords at these shifts as can be seen from the shifted auto-correlation profile of the CCK-codewords drawn below:
2. It also does not depend upon the phase $\phi_1$ of the CCK codeword.
3. Moreover the $\phi_4$ phase of the CCK codewords seems to act as the phase of the error contribution. Coupled with the above result, this means that to apply a constant equalization correction at the output of the ML-CCK correlator we need to store Pcorr$_i$ for all possible combinations of $\phi_2$ and $\phi_3$ only. That means we store only 16 corrections, and to get the remaining we just multiply these by all possible $\phi_4$ (i.e., 1, j, −1, −j).

Derivation of Equation B generating
Pre-Equalization Coefficients for the "Chip
Smearing" Pre-Equalization Value Generator of
FIG. 13

Let the inputs $r_1$ to $r_m$, $r_{m+1}$ to $r_{m+m}$, ..., $r_{vm+1}$ to $r_{vm+m}$, and so on, correspond to the codewords $R_1, R_2, \ldots, R_v$, and so on. On each chip there will be the effect of post-cursors due to the chips of q previous codewords. Where q=[(FILTER_LEN−1)/m]+1 ([.] denotes the smallest integer greater than or equal to). That is, on $r_{vm+i}$ there will be effect of post-cursors of the chips of $R_{v-q}$ to $R_{v-1}$.

Hence the previous codeword post-cursor effect on $r_{vm+j}$ is given by:

$$Q_j = \sum_{u=j}^{\text{FILTER\_LEN}} c_u r^d_{(vm+j)-u} \text{ for } j = 1 \text{ to } m; \quad \text{(Equation B)}$$

We claim:

1. A system for demodulating a current complementary code keying (CCK) symbol, being one of n symbols, and a previous decision into decision data, where said symbol is formed from a plurality of CCK chips, said system comprising:
   a first plurality said n/16 of post-equalization registers, each said register having a post-equalization estimate containing an inter-chip interference correction derived from said complementary code keying symbols and a channel characteristic;
   an iteration variable k generating a phase φ2;
   a pre-equalization register having an inter-symbol interference correction value based on one or more previous symbol decisions compensated with a channel characteristic;
   a first subtractor having a first input coupled to said current symbol, a second input coupled to said pre-equalization register, and an output equal to said second input subtracted from said first input;
   a demodulator including in sequence:
      a Fast Walsh Transform (FWT) with an FWT input and an FWT output, said FWT input coupled to said first subtractor output, said FWT also coupled to said phase φ2 for use as an FWT butterfly input;
      a second subtracter having an output formed by subtracting said post-equalization register values from said FWT output;
      a demodulator biggest picker coupled to said second subtracter output, said demodulator picker having a MAX(k) output equal to the largest magnitude said second subtracter output, and an OUTPUT(k) indicating which said second subtracter output was the largest magnitude;
      the demodulator having an output coupled to said demodulator biggest picker;
   a final biggest picker coupled to said demodulator output and also to said k, such that for all said k, said final biggest picker selects the largest magnitude said MAX(k), and forms a data decision using said k, the phase of said MAX(k), and said OUTPUT(k) associated with said MAX(k)
   where said iteration variable k has more than one value for a said CCK symbol.

2. The system of claim 1 where said n=256, said symbol is one of 256 said symbols, and said number of post equalization registers is 16.

3. The system of claim 1 where said iteration variable k has one of four different values.

4. The system of claim 3 where a subset of said post equalization register values were computed using said φ2, and said subset of register values is expanded into 16 post equalization values by multiplication by φ4={1, j, −1, −j} for each said iteration variable k.

5. The system of claim 4 where said subset of said post equalization register values using said φ2 contains four such values.

6. The system of claim 1 where said demodulator biggest picker selects the largest magnitude one of 16 complex values.

7. The system of claim 1 where said final biggest picker selects the largest magnitude one of k said demodulator biggest picker values.

8. The system of claim 7 where said k=4.

9. The system of claim 1 where said n=256, said k=4, and said post-equalization register has 16 complex values, four of which are expanded into 16 by multiplying by the phase φ4={1,j,−1,−j}.

10. The system of claim 1 where said post-equalization register values are computed during a preamble time.

11. The system of claim 1 where said first set of pre-equalization register values are computed from previous decision values.

12. The system of claim 1 where said post equalization register values are computed from:

$$\text{Reg}_i = e^{j\phi 4}(-C_1 e^{-j(\phi 2+\phi 3)} + 2C_3 e^{(-j\phi 2)} + C_3 e^{j(\phi 2-\phi 3)} + 2C_5 e^{j(\phi 2)} + C_5 e^{j(\phi 3-\phi 2)} + C_7 e^{j(\phi 2+\phi 3)}).$$

13. The system of claim 1 where said pre-equalization register values are computed from $$Qj = \sum_{u=j}^{\text{flt\_len}} C_u r^d_{(vm+j)-u}.$$

14. The system of claim 1 where said pre-equalization register is of width $N_{symbol}$, and each register location is serially loaded with a complex value computed by loading of a previous symbol decision value into a plurality $N_{symbol}$ of registers during a loading interval, and thereafter serially clocking said previous decision value through a coupled plurality $N_{flt\_len}$ of registers, each said register having an output which selects one of the values {1,j,−1,−j} and applying each said selected value to an adder having Nflt_len of inputs and a single output, the output of said adder forming a serial stream of data for each said pre-equalization register.

15. A method for demodulating one or more complementary code keying (CCK) symbols from a packet where said CCK symbols are preceded by a preamble, said process comprising:
   a first step of characterizing a communications channel during said preamble;
   a second step of generating a first set of channel coefficients for use in a pre-equalization value generator and a reduced set of second channel coefficients for use in generating a set of post-equalization register values;
   a third step of subtracting a previous decision correction stored in said pre-equalization register to generate a first subtractor output;
   a fourth step of iteratively demodulating a current symbol with an iteration variable k coupled to a phase variable φ2 by:
      applying said current symbol to a demodulator for each said iteration variable k value;
      performing a Fast Walsh Transform (FWT) on said first subtractor output, said FWT also using said φ2 as a butterfly input, thereafter subtracting from said FWT output a subset of post-equalization register values expanded into a current set by multiplication by four possible values of a phase φ4={1,j,−1,−j} and presenting said subtraction result to a demodulator biggest picker;

said demodulator biggest picker selecting the largest magnitude said FWT output for a given said k value;

a final picker selecting the largest said demodulator biggest picker output from said k iterations of a single symbol;

said final picker selecting an input having a largest magnitude demodulator biggest picker output from said k iterations into a decision value;

a fifth step of converting said decision value into said pre-equalization register values placed in said pre-equalization register in combination with said coefficients to generate a new set of pre-equalization register values to be used with a next current symbol;

repeating said third, said fourth, and said fifth steps for the duration of the packet.

16. The process of claim 15 where said channel characterization results in the generation of feedback filter coefficients $\{C_1 \ldots C_N\}$, where said N is a filter-tap length.

17. The process of claim 16 where said first set of channel coefficients comprises $\{C1 \ldots C7\}$ for 8-tap filter length and $\{C1 \ldots C15\}$ for 16-tap filter length.

18. The process of claim 17 where said first set of channel coefficients are applied to said pre-equalization register of width $N_{symbol}$, and each register location is serially loaded with a complex value computed by loading of a previous symbol decision value into a plurality $N_{symbol}$ of registers during a loading interval, and thereafter serially clocking said previous decision value through a coupled plurality $N_{flt\_len}$ of registers, each said register having an output which selects one of the values $\{1,j,-1,-j\}$ and applying each said selected value to an adder having Nflt_len of inputs and a single output, the output of said adder forming a serial stream of data for each said pre-equalization register.

19. The process of claim 16 where said second set of channel coefficients comprises $\{C1,C3,C5,C7\}$.

20. The process of claim 19 where said post equalization register values computed during said preamble time are:

$$Reg_i = e^{j\phi 4}(-C_1 e^{-j(\phi 2+\phi 3)} + 2C_3 e^{(-j\phi 2)} + C_3 e^{j(\phi 2-\phi 3)} 2C_5 e^{j(\phi 2)} + C_5 e^{j(\phi 3-\phi 2)} + C_7 e^{j(\phi 2+\phi 3)}).$$

21. The process of claim 15 where said converting said decision value into pre-equalization register values performs the operation:

$$Qj = \sum_{u=j}^{flt\_len} C_u r^d_{(vm+j)-u}.$$

22. The process of claim 15 where said preamble includes a start of frame delimiter and header, during which time said post equalization coefficients $\{C1,C3,C5,C7\}$ are computed.

23. The process of claim 22 where said post equalization register values are computed in the duration following said preamble.

24. For a complementary code keying system having a subset $\{C1,C3,C5,C7\}$ of a coefficient set $\{C1,C2,C3,C4,C5,C6,C7,C8,\ldots C15,C16\}$, a process for computing a complete set of possible post-equalization symbol values representing channel-compensated symbols, said process comprising:

a first step of generating each of 16 phase values from $\{\phi 2,\phi 3\}$, where each of $\phi 2,\phi 3$ is one of the complex values $\{1, j, -1, -j\}$, and for each of said 16 phase combinations:

computing said intermediate value $(\phi 2,\phi 3) = (-C_1 e^{-j(\phi 2+\phi 3)} + 2C_3 e^{(-j\phi 2)} + C_3 e^{j(\phi 2-\phi 3)} + 2C_5 e^{j(\phi 2)} + C_5 e^{j(\phi 3-\phi 2)} + C_7 e^{j(\phi 2+\phi 3)})$;

thereafter generating all possible intra-codeword ISI effects by multiplying each of said 16 intermediate value by each complex value $\{1,j,-1,-j\}$.

25. The system of claim 24 where said intermediate values are stored in 16 registers.

26. The system of claim 25 where said intermediate values are complex values and said registers include a real part and an imaginary part.

27. An apparatus for converting a code symbol of length $n_{symbol}$ to a channel compensated decision feedback value, said code symbol comprising a plurality of code chips, said apparatus having:

a plurality flt_len of registers, each said register having an input and an output;

a plurality of first multiplexers, each said multiplexer coupling each said code chip to a corresponding said register input during a first interval, each said multiplexer coupling said register input to a unique said register output at other times;

a plurality of second multiplexers, each said second multiplexer having a select input coupled to a corresponding said register, each said second multiplexer generating an output equal to a coefficient value multiplied by one of $\{1,j,-1,-j\}$ associated with said select input;

an adder summing the outputs of said second multiplexers and forming said decision feedback value;

where said flt_len is greater than said $n_{symbol}$.

* * * * *

UNITED STATES PATENT AND TRADEMARK OFFICE
CERTIFICATE OF CORRECTION

PATENT NO. : 7,412,000 B1  
APPLICATION NO. : 10/934275  
DATED : August 12, 2008  
INVENTOR(S) : Sankabathula Dharani Naga Sailaja et al.

Page 1 of 1

It is certified that error appears in the above-identified patent and that said Letters Patent is hereby corrected as shown below:

Column 9, line 8 "{MAX(O).MAX(3)}" should be changed to --{MAX(0).MAX(3)}--

Column 13, line 54 "through $C_{flt\ len}$ were" should be changed to
--through $C_{flt\_len}$ were--

Column 15, line 7 "-$e^{j(\Phi 1+\Phi\Phi 4)}$" should be changed to -- -$e^{j(\Phi 1+\Phi 4)}$--

Column 15, line 10 "$e^{j(\Phi 1+\Phi\Phi 4)}$" should be changed to --$e^{j(\Phi 1+\Phi 4)}$--

Column 15, line 63 "$P_3$= -{$C_1$\{1,2,4\} + $C_2$\{1,3,4\} + $C_3$\{1,2,3,4\}} · \{1,4\}" should be changed to --$P_3$=-{$C_1$\{1,2,4\} + $C_2$\{1,3,4\} + $C_3$\{1,2,3,4\}} · \{1,4\}*--

Column 16, line 23 "P$corr_1$=" should be changed to --P$corr_i$=--

Column 18, line 20 "Reg$_i$=$^{j\Phi 4}$" should be changed to --Reg$_i$=$e^{j\Phi 4}$--

Signed and Sealed this

Eighth Day of September, 2009

David J. Kappos  
*Director of the United States Patent and Trademark Office*